(12) United States Patent
Ishida

(10) Patent No.: US 10,154,363 B2
(45) Date of Patent: Dec. 11, 2018

(54) ELECTRONIC APPARATUS AND SOUND OUTPUT CONTROL METHOD

(71) Applicant: KYOCERA Corporation, Kyoto (JP)

(72) Inventor: Yuuji Ishida, Fujisawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/370,481

(22) Filed: Dec. 6, 2016

(65) Prior Publication Data

US 2017/0188171 A1    Jun. 29, 2017

(30) Foreign Application Priority Data

Dec. 25, 2015    (JP) .................... 2015-253134

(51) Int. Cl.
| | | |
|---|---|---|
| H04S 7/00 | (2006.01) | |
| G01S 15/42 | (2006.01) | |
| G06F 3/16 | (2006.01) | |
| H04R 5/02 | (2006.01) | |
| H04R 29/00 | (2006.01) | |
| G01S 17/02 | (2006.01) | |
| G01S 17/08 | (2006.01) | |
| G01S 17/46 | (2006.01) | |
| G01S 7/539 | (2006.01) | |
| G01S 7/54 | (2006.01) | |
| G01S 15/04 | (2006.01) | |
| G01S 15/08 | (2006.01) | |

(Continued)

(52) U.S. Cl.
CPC .............. *H04S 7/303* (2013.01); *G01S 7/539* (2013.01); *G01S 7/54* (2013.01); *G01S 15/04* (2013.01); *G01S 15/08* (2013.01); *G01S 15/42* (2013.01); *G01S 15/88* (2013.01); *G01S 17/026* (2013.01); *G01S 17/08* (2013.01); *G01S 17/46* (2013.01); *G06F 3/165* (2013.01); *H04R 3/12* (2013.01); *H04R 5/02* (2013.01); *H04R 29/002* (2013.01); *G01S 15/003* (2013.01); *H04R 1/403* (2013.01); *H04R 2201/401* (2013.01); *H04R 2430/01* (2013.01); *H04R 2499/11* (2013.01)

(58) Field of Classification Search
CPC .......... H04S 7/303; G01S 15/42; G06F 3/165; H04R 5/02; H04R 29/002
USPC ............................................. 381/58
See application file for complete search history.

(56) References Cited

U.S. PATENT DOCUMENTS

| | | | |
|---|---|---|---|
| 2010/0202633 A1* | 8/2010 | Kim .................... | H04S 7/30 381/107 |
| 2012/0222589 A1* | 9/2012 | Miyashita ............. | E05G 1/005 109/40 |

(Continued)

FOREIGN PATENT DOCUMENTS

| | | |
|---|---|---|
| JP | H04-200045 A | 7/1992 |
| JP | 2004-349815 A | 12/2004 |
| JP | 2014-165862 A | 9/2014 |

OTHER PUBLICATIONS

Kim Yong Hyun, System for business card administration, Nov. 3, 2014.*

*Primary Examiner* — Quynh Nguyen

(74) *Attorney, Agent, or Firm* — Studebaker & Brackett PC

(57) ABSTRACT

An electronic apparatus includes a plurality of sound output units. The electronic apparatus includes a detection unit for detecting an object around the electronic apparatus. The electronic apparatus includes a controller for controlling a signal to be output to the sound output unit based on a result of detection by the detection unit.

20 Claims, 20 Drawing Sheets

(51) Int. Cl.
    *G01S 15/88*    (2006.01)
    *H04R 3/12*     (2006.01)
    *G01S 15/00*    (2006.01)
    *H04R 1/40*     (2006.01)

(56) References Cited

U.S. PATENT DOCUMENTS

| | | | |
|---|---|---|---|
| 2015/0022316 A1* | 1/2015 | Dixon | G08B 25/001 340/5.51 |
| 2016/0014500 A1 | 1/2016 | Takano et al. | |

* cited by examiner

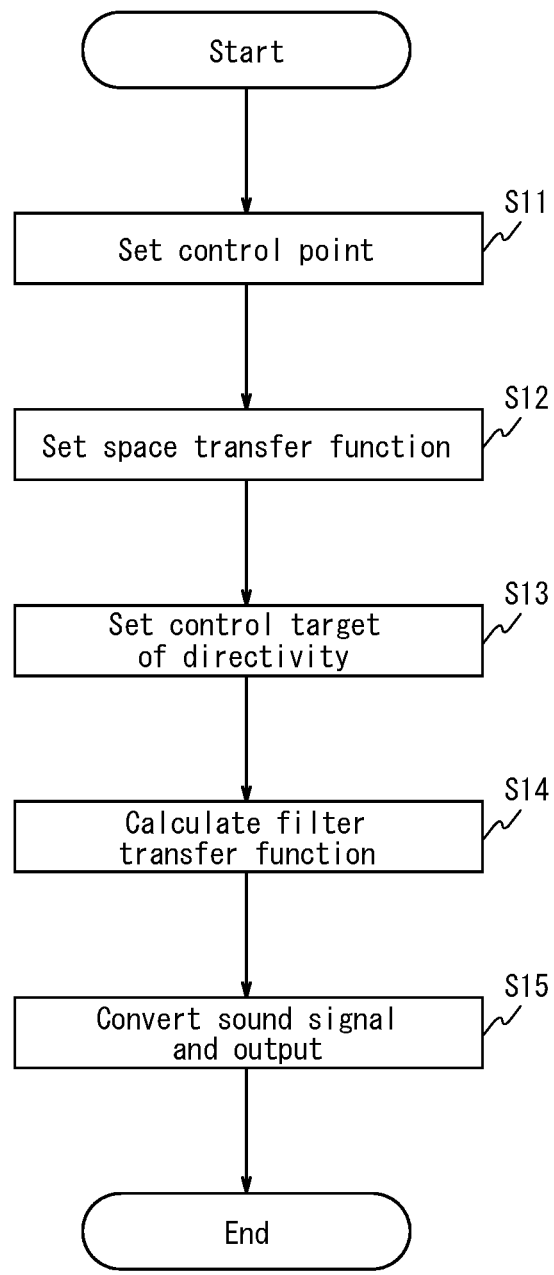

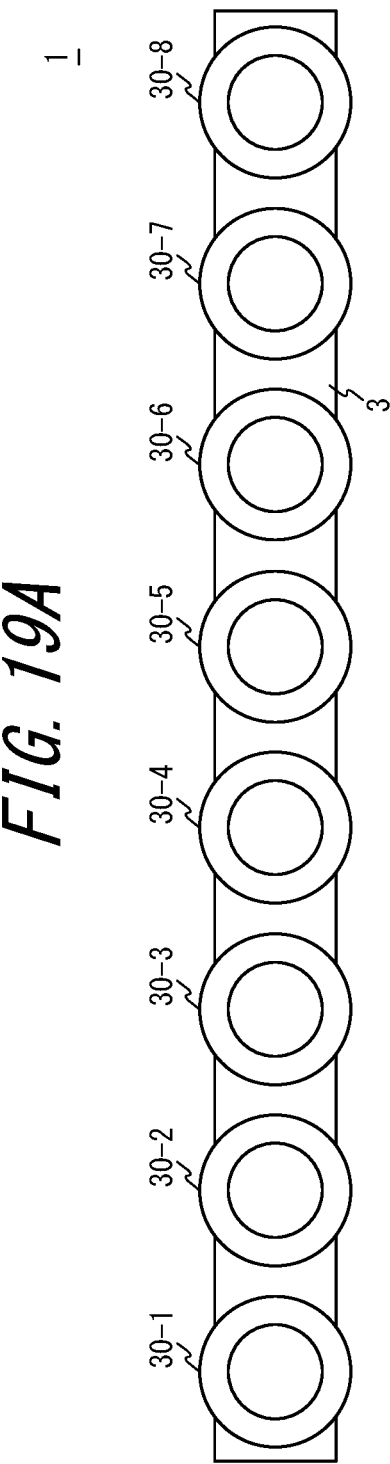
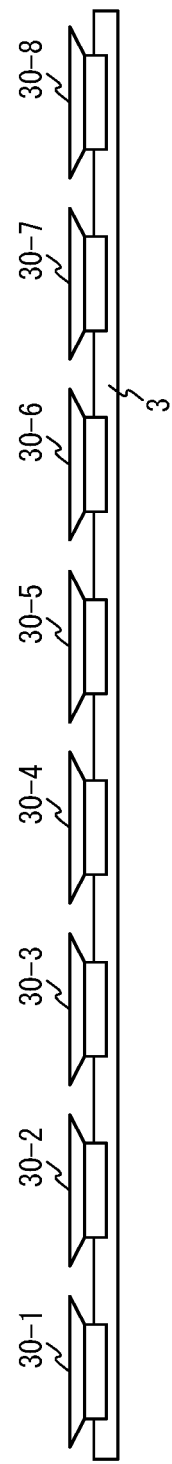

ELECTRONIC APPARATUS AND SOUND OUTPUT CONTROL METHOD

CROSS-REFERENCE TO RELATED APPLICATIONS

This application claims priority to and the benefit of Japanese Patent Application No. 2015-253134 filed on Dec. 25, 2015, the entire contents of which are incorporated herein by reference.

TECHNICAL FIELD

This disclosure relates to an electronic apparatus for outputting a sound by controlling a directivity and a sound output control method.

BACKGROUND

Conventionally, an earphone is used to prevent audio output from a speaker of an electronic apparatus from leaking to a third party other than a user of a terminal. Or, speakers having a narrow directivity such as a plane wave speaker and a parametric speaker are used. The speakers having a narrow directivity such as the plane wave speaker and the parametric speaker cannot always prevent the audio from leaking to the third party other than the user of the electronic apparatus.

SUMMARY

An electronic apparatus of the disclosure herein includes a plurality of sound output units. The electronic apparatus includes a detection unit for detecting an object around the electronic apparatus. The electronic apparatus includes a controller for controlling a signal to be output to the sound output unit based on a result of detection by the detection unit.

A sound output control method of the disclosure herein includes detecting an object around an electronic apparatus having a plurality of sound output units. The sound output control method includes controlling, based on a result of detection, a signal to be output to the sound output unit.

BRIEF DESCRIPTION OF THE DRAWINGS

In the accompanying drawings:

FIG. 7 is a flowchart illustrating a method of controlling a directivity of an output of the speaker;

FIGS. 19A and 19B illustrate an example of the electronic apparatus in the shape of a band having the speakers linearly arranged;

DETAILED DESCRIPTION

Embodiment

Hereinafter, an electronic apparatus according to one embodiment will be described in detail with reference to the drawings. Note that the drawings used in the following description are schematic, and dimensions and ratios therein do not necessarily correspond to actual dimensions and ratios, respectively.

[Configuration of Apparatus]

Figure 1:
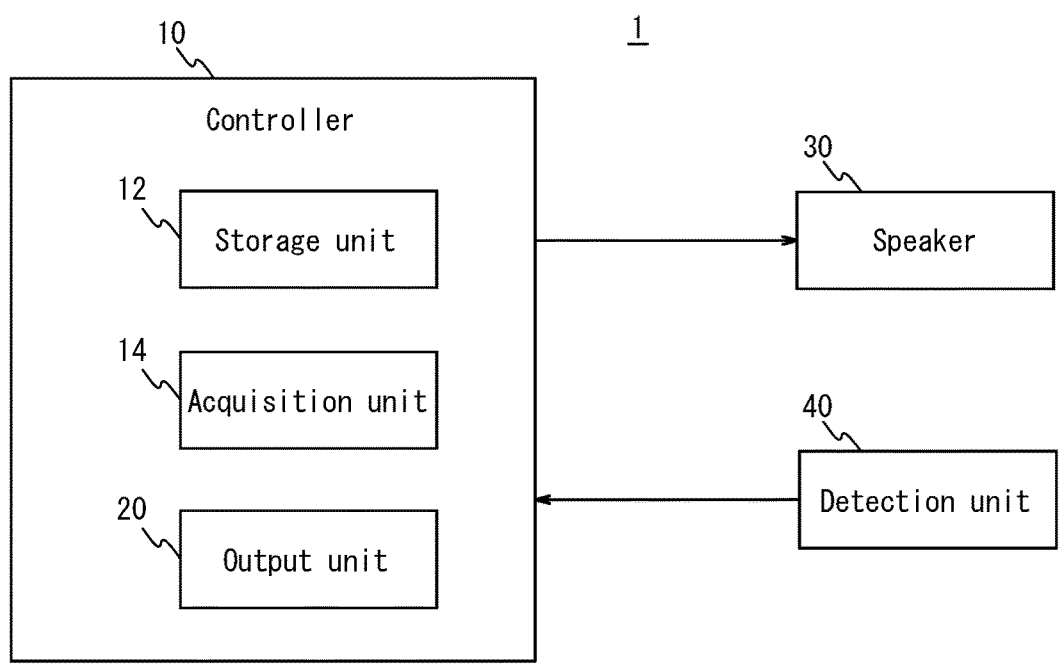
FIG. 1 is a functional block diagram illustrating an example of a schematic configuration of an electronic apparatus according to one embodiment.

FIG. 1 is a functional block diagram illustrating an example of a schematic configuration of an electronic apparatus 1 according to the present embodiment. The electronic apparatus 1 includes a controller 10 serving as a control unit, a speaker 30 serving as a sound output unit, and a detection unit 40.

The controller 10 includes a storage unit 12, an acquisition unit 14, and an output unit 20. The controller 10 may be constituted by using a processor, a microcomputer, or the like capable of executing application software. The controller 10 controls and manages each function unit and constituent which are essential to operate the electronic apparatus 1.

The storage unit 12 may be constituted by using a semiconductor memory or the like and stores various information, a program for operating the electronic apparatus 1, and the like. Also, the storage unit 12 is used as a working memory of the controller 10. The storage unit 12 also stores audio data output to the speaker 30. The audio data may be, for example, music data to be reproduced, audio data of a video to be viewed, and voice data of the other party when the electronic apparatus 1 is used for a telephone call, but not limited thereto.

The acquisition unit 14 acquires data from the detection unit 40. The data acquired from the detection unit 40 will be descried later. The acquisition unit 14 also acquires data from another apparatus connected to the electronic apparatus 1. The data acquired from another apparatus is, for example, the audio data described above but not limited thereto. The controller 10 performs various control by using the data acquired by the acquisition unit 14. The controller 10 may store the data acquired by the acquisition unit 14 in the storage unit 12.

The output unit 20, based on the audio data stored in the storage unit 12 or the audio data acquired by the acquisition unit 14, generates an audio signal which may be reproduced by the speaker 30 and outputs the audio signal to the speaker 30.

Although the storage unit 12 is included in the controller 10 in FIG. 1, the storage unit 12 may be provided outside the controller 10 as a separate storage apparatus. Also, the acquisition unit 14 and the output unit 20, similarly to the storage unit 12, may be provided outside the controller 10 as separate apparatuses.

The electronic apparatus 1 includes a plurality of speakers 30. According to the present embodiment, the electronic apparatus 1 includes N-number of speakers 30-1 to 30-N (N: a natural number equal to or larger than 2). Hereinafter, when it is not necessary to distinguish the speakers 30-1 to 30-N from one another, the speakers 30-1 to 30-N are collectively referred to as the speaker 30. The speaker 30 is connected to the output unit 20 of the controller 10 and outputs a sound wave by vibrating a diaphragm based on the audio signal output from the output unit 20.

The speaker 30 according to the present embodiment has a speaker axis. The speaker axis is an axis directing to a front side of the speaker 30 via a center of the speaker 30. Hereinafter, the speaker axis is referred to as an axis of the speaker, or simply as an axis. Although the speaker 30 has the speaker axis for the sake of convenience of the description, the electronic apparatus 1 according to the present embodiment may have the speaker 30 with no speaker axis defined.

Figure 2:
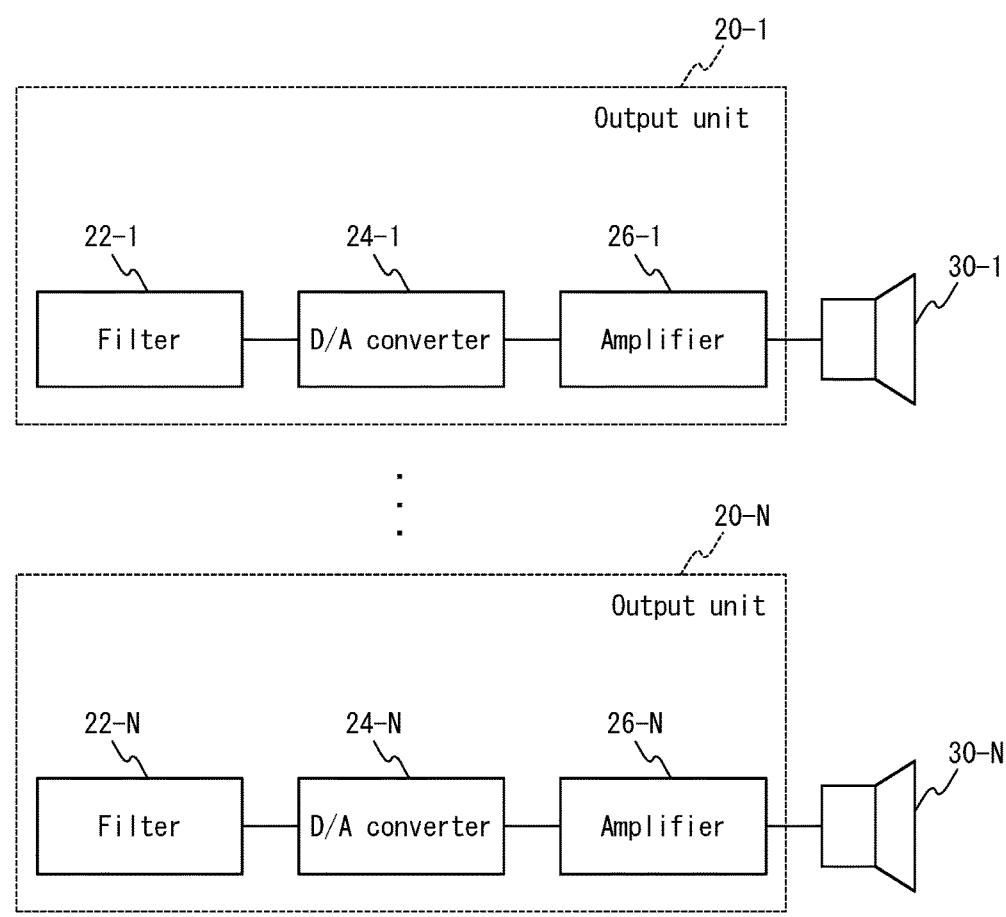
FIG. 2 is a block diagram illustrating an example of a configuration of an output unit and a connection thereof to a speaker.

FIG. 2 is a block diagram illustrating an example of a configuration of the output unit 20 and a connection between the output unit 20 and the speaker 30. The number of output units 20 corresponds to the number of speakers 30. Hereinafter, when it is necessary to distinguish N-number of output units 20 from one another, the output units 20 are referred to as output units 20-1 to 20-N. The speakers 30-1 to 30-N are connected to the output units 20-1 to 20-N, respectively. The output units 20-1 to 20-N may be implemented by separate circuits or units, or one or more circuits or units for performing signal processing of multi-channels.

An output unit 20-$i$ ($i$: a natural number equal to or smaller than N) includes a filter 22-$i$, a D/A converter 24-$i$, and an amplifier 26-$i$. Hereinafter, when it is not necessary to distinguish between filters 22-1 and 22-N, between D/A converters 24-1 and 24-N, and between amplifiers 26-1 and 26-N, the filters, D/A converters, and amplifiers are collectively referred to as a filter 22, a D/A converter 24, and an amplifier 26, respectively.

The filter 22 converts the audio data input thereto into the audio signal based on a filter transfer function and outputs the audio signal. The filter 22 has the filter transfer function, and the filter transfer function of the filter 22-$i$ is referred to as $Hi$ ($i$: a natural number equal to or smaller than N). The audio signal input to and output from the filter 22 is a digital signal according to the present embodiment but is not limited thereto. The audio signal may be an analogue signal.

The D/A converter 24 converts a digital audio signal output from the filter 22 into an analogue audio signal. When the audio signal output from the filter 22 is the analogue signal, the D/A converter 24 may be omitted.

The amplifier 26 amplifies the analogue audio signal output from the D/A converter 24 or the filter 22 and outputs an amplified audio signal to the speaker 30.

The filter 22, the D/A converter 24, and the amplifier 26 may be implemented by using separated circuits or chips, or one circuit or chip in a collective manner.

The detection unit 40 detects surrounding conditions of the electronic apparatus 1. The detection unit 40 outputs a result of detection of the surrounding conditions to the controller 10. The detection unit 40 includes, for example, a camera 46 (see FIG. 13) which functions as an imaging unit for capturing an image. The camera 46 images (hereinafter, also referred to as "captures") around the electronic apparatus 1 and outputs a captured image to the controller 10. In this case, the controller 10 may detect the surrounding conditions of the electronic apparatus 1 by processing and analyzing the image acquired from the camera 46.

Also, the detection unit 40 includes various sensors such as, for example, an ultrasonic sensor 42 (see FIGS. 9A and 9B) or an infrared sensor 44 (see FIG. 12), and a microphone. These sensors and microphone measure (detect) a distance from the electronic apparatus 1 to an object located therearound, a size of the object, and the like and output a result of measurement (a result of the detection) to the controller 10. In this case, the controller 10 may detect the surrounding conditions of the electronic apparatus 1 by processing and analyzing the result of the measurement (the result of the detection) acquired from the detection unit 40.

Figure 3:
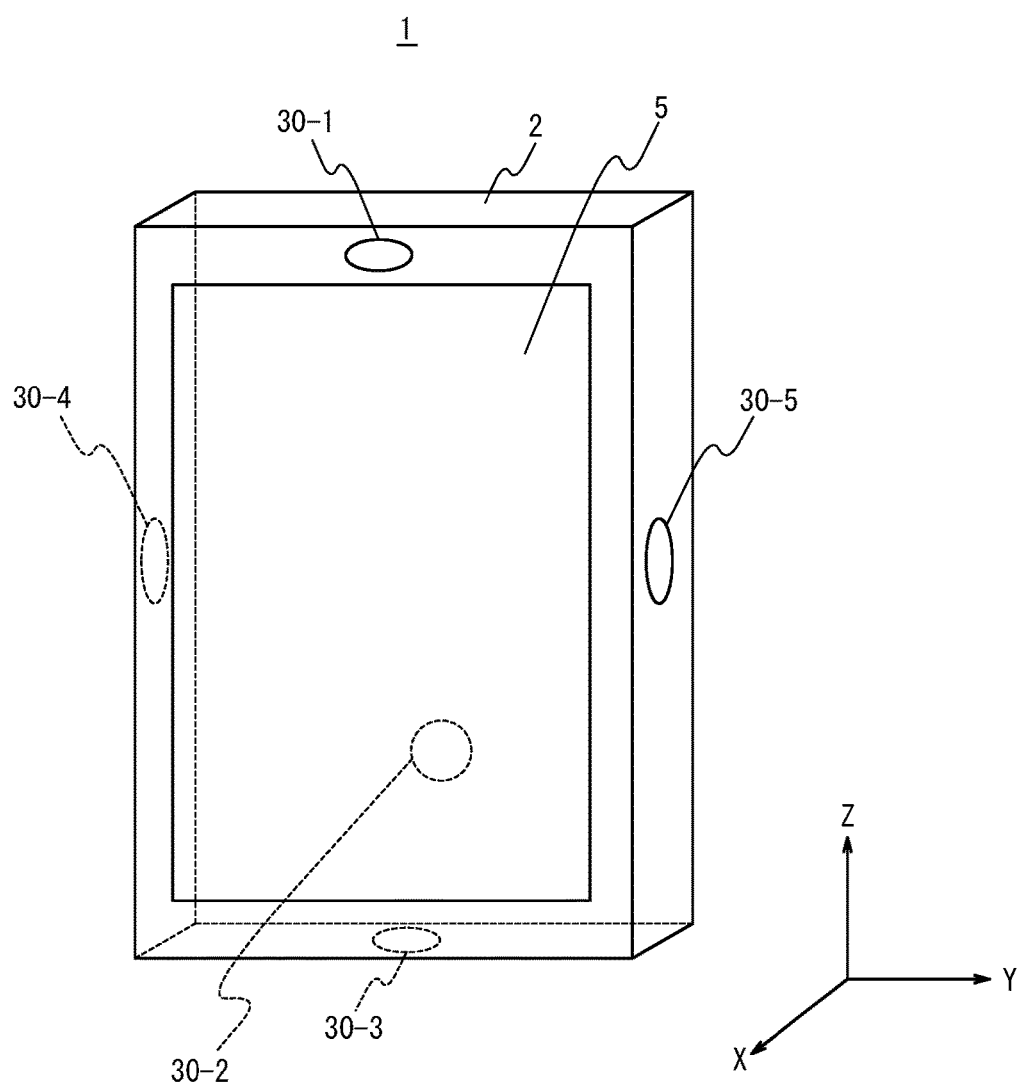
FIG. 3 is a perspective view illustrating an example of the electronic apparatus.

FIG. 3 is a perspective view illustrating an example of the electronic apparatus 1. The electronic apparatus 1 illustrated in FIG. 3 is a smartphone with a housing 2 having an approximately hexahedral plate-like shape. FIG. 3 illustrates an XYZ coordinate system, in which a normal direction of a front surface of the housing 2 corresponds to a positive direction of an X-axis, a right-side surface of the housing 2 corresponds to a positive direction of a Y-axis, and a top surface of the housing 2 corresponds to a positive direction of a Z-axis.

The electronic apparatus 1 illustrated in FIG. 3 further includes a touch panel 5 on the front surface of the housing 2. The touch panel 5 includes a display device such as a liquid crystal display or an organic EL display, and a touch sensor.

The electronic apparatus 1 illustrated in FIG. 3 further includes the speakers 30-1 to 30-5, each of which is provided on a different surface of the housing 2. The speaker 30-1 is arranged above the touch panel 5 on the front surface of the housing 2 and has an axis oriented in the positive direction of the X-axis. The speaker 30-2 is arranged in a lower portion of a rear surface of the housing 2 and has an axis oriented in a negative direction of the X-axis. The speaker 30-3 is arranged on a bottom surface of the housing 2 and has an axis oriented in a negative direction of the Z-axis. The speaker 30-4 and the speaker 30-5 are arranged on a left-side surface and the right-side surface of the housing 2, respectively. An axis of the speaker 30-4 and an axis of the speaker 30-5 are oriented in a negative direction of the Y-axis and the positive direction of the Y-axis, respectively.

An arrangement of the speakers 30 is not limited to the example illustrated in FIG. 3. Also, the number of speakers 30 to be arranged is not limited to five as illustrated in FIG. 3, and each surface is not necessarily provided with one speaker. Preferably, the speakers 30 are arranged in such a manner that respective axes thereof are oriented in different directions.

Also, the electronic apparatus 1 may include a terminal, the microphone, an operation button, and the like on the housing 2.

[Directivity Characteristics]

When a sound is output from the speaker 30 of the electronic apparatus 1, the sound is preferably audible to a user of the electronic apparatus 1 alone, or one or more users who wish to listen. That is, directivity characteristics of the speaker 30 is controlled such that a sound pressure level of the sound wave output in the direction of the user becomes higher than that output in other directions. The following is a description of the directivity characteristics of a typical speaker set. Here, the sound pressure refers to a changing portion of a pressure of a medium when the sound wave exists in the medium.

Typically, the directivity characteristics of the speaker set is represented by, considering the speaker set as a point sound source, the sound pressure of the sound wave output into various directions from the point sound source. The sound pressure is expressed by the sound pressure level with respect to a minimum sound pressure audible to a human as a reference. A unit of the sound pressure is dB. The sound wave output from the point sound source is directed in all directions in a three-dimensional space and, by cutting out one plane containing the point sound source, the directivity characteristics on the plane may be indicated.

Figure 4:
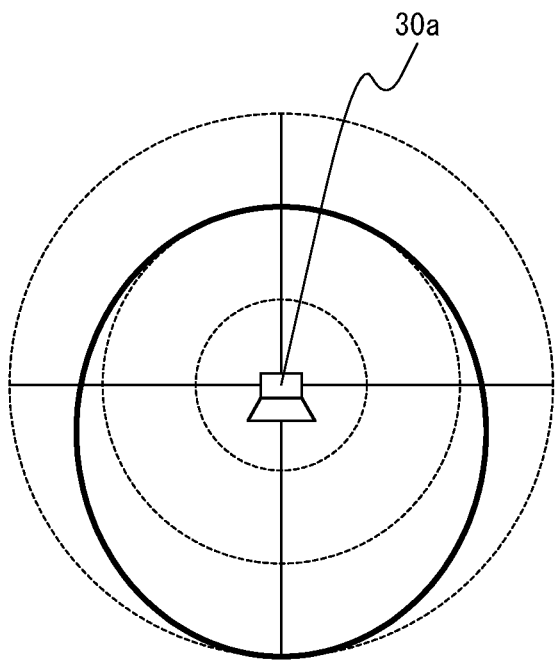
FIG. 4 is an example of directivity characteristics of a speaker having one main speaker.
Figure 5:
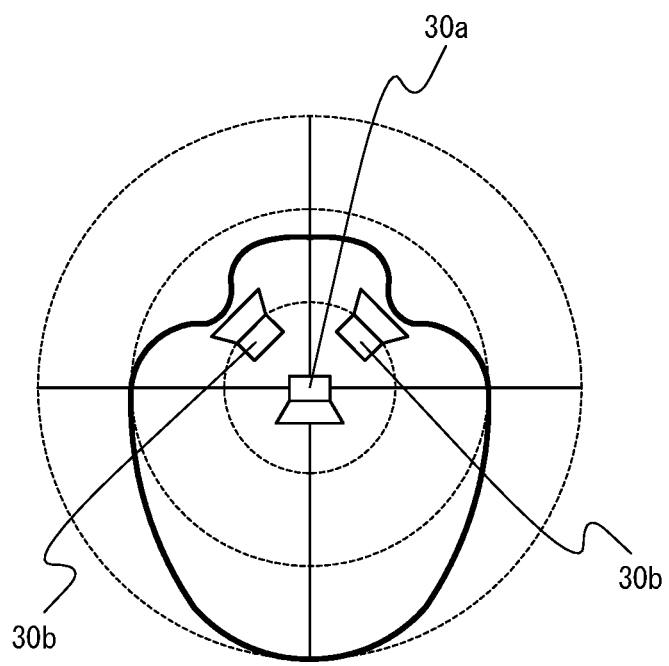
FIG. 5 is an example of directivity characteristics of a speaker having one main speaker and two auxiliary speakers.

FIG. 4 and FIG. 5 are diagrams of the directivity characteristics of the speaker set. In these diagrams of the directivity characteristics, the sound pressure level output into various directions from the point sound source representing the speaker set is represented by a bold solid line. In these diagrams of the directivity characteristics, also, an axis of a main speaker 30*a* of the speaker set (a front direction of the speaker set) is oriented in a downward direction.

FIG. 4 is an example of the diagram of the directivity characteristics of a speaker set with one main speaker 30*a*. In FIG. 4, the sound pressure level in the downward direction corresponding to the front direction of the main speaker 30*a* is the highest. However, the sound pressure levels in left and right directions and in an upward direction corresponding to a rear direction of the main speaker 30*a* is also high. That is, the directivity characteristics of the speaker set illustrated in FIG. 4 do not have a narrow directivity having a high sound pressure level in a particular direction alone but have a wide directivity to have high sound pressure level overall.

FIG. 5 is an example of the diagram of the directivity characteristics of a speaker set with one main speaker 30*a* and two auxiliary speakers 30*b*. In FIG. 5, similarly to FIG. 4, the sound pressure level in the downward direction corresponding to the front direction of the main speaker 30*a* is the highest. Here, unlike FIG. 4, the sound pressure levels in the left and right directions and in the upward direction corresponding to the rear direction of the main speaker 30*a* are low. Therefore, it can be said that the directivity characteristics of the speaker set illustrated in FIG. 5 has the narrow directivity in the front direction of the speaker set. Such directivity characteristics may be obtained when the sound waves output from the two auxiliary speakers 30*b* cancel the sound waves output from the main speaker 30*a* travelling in the left and right directions and in the upward direction.

The directivity characteristics of the speaker set is characterized by one of the narrow directivity, the wide directivity, and non-directivity which does not show a predetermined directivity. Hereinafter, the directivity of the directivity characteristics of the speaker set is referred to simply as the directivity of the speaker set.

It has been qualitatively described above about the directivity characteristics of the typical speaker set with reference to FIG. 4 and FIG. 5. Note that there also is a method to indicate the directivity characteristics of the speaker set by using quantitative indices, and one of the indices includes a directivity angle. The directivity angle is defined as a stretching angle from the front direction of the speaker set where the sound pressure level becomes maximum to a direction where the sound pressure level decreases by half (−6 dB).

The directivity characteristics of the typical speaker set as described above may be associated with the directivity characteristics of a plurality of speakers 30 of the electronic apparatus 1 according to the present embodiment. That is, in the present embodiment, one of a plurality of speakers 30 may be associated with the main speaker 30*a* while other speakers 30 may be associated with the auxiliary speakers 30*b*. Then, the controller 10 of the electronic apparatus 1 may control, by controlling respective outputs of the speakers 30, the directivity characteristics of a plurality of speakers 30 being considered as one speaker set, i.e., the point sound source. For example, the controller 10 may control, in order to prevent the sound to reach a third party other than the user, the directivity characteristics to have the narrow directivity in the direction of the user.

For example, in the electronic apparatus 1 illustrated in FIG. 3, by collectively considering the speakers 30-1 to 30-5 as one point sound source, the point sound source may be considered to be located where the speaker 30-1 is arranged. In this case, the directivity characteristics illustrated in FIG. 4 corresponds to the directivity characteristics on an XY plane when the sound wave is output from the speaker 30-1 alone. Also, the directivity characteristics illustrated in FIG. 5 corresponds to the directivity characteristics on the XY plane when the speaker 30-1 is considered as the main speaker 30*a* and the speakers 30-2 to 30-5 are considered as the auxiliary speakers 30*b*. That is, in the electronic apparatus 1 illustrated in FIG. 3, the controller 10 may control the respective outputs of the speakers 30-1 to 30-5 in such a manner that the speaker 30 has the directivity characteristics of the narrow directivity as a whole.

[Control Method of Directivity Characteristics]

As described above, by controlling the respective outputs of the speakers 30 collectively considering a plurality of speakers 30 as one point sound source, the directivity of the point sound source may be controlled. The following is a description about a control method of the directivity characteristics of the speaker 30 when N-number of speakers 30-1 to 30-N as illustrated in FIG. 2 are collectively considered as the speaker 30 serving as a single point sound source.

<Setting Control Point>

The directivity characteristics of the speaker 30 is determined by the sound pressure level of the sound wave reaching a position at a predetermined distance from the speaker 30 considered as the point sound source. Therefore, a control point is provided at the predetermined distance from the speaker 30, and the sound pressure level at the control point is controlled to be turned on or off, so as to control the directivity characteristics of the speaker 30. Hereinafter, the predetermined distance from the speaker 30 to the control point is also referred to as a control distance.

Here, when the sound pressure level at the control point is on, it means that the sound pressure level is at least at a first sound pressure level, which is a sound pressure level at which the sound is sufficiently audible to the user. On the other hand, when the sound pressure level at the control point is off, it means that the sound pressure level at the control point is lower than a second sound pressure level, which is a sound pressure level at which the sound does not leak to the third party other than the user.

Figure 6:
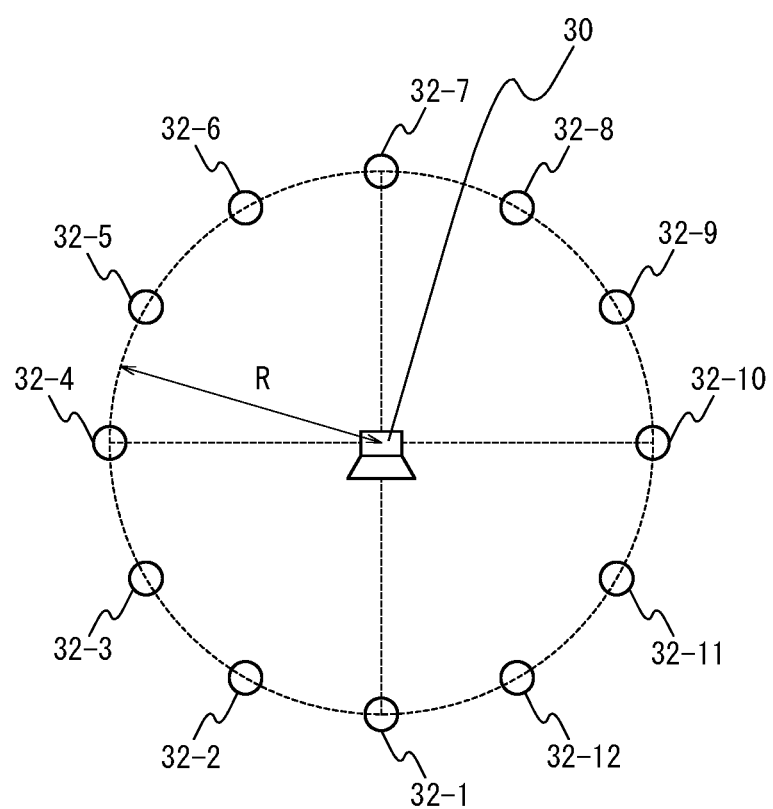
FIG. 6 is an example of an arrangement of speaker control points.

FIG. 6 is a diagram illustrating an example of an arrangement of the control points of the speaker 30. In FIG. 6, on a circumference having the speaker 30 considered as the point sound source at a center thereof and the control distance (denoted by R) serving as a radius, virtual microphones 32-1 to 32-12 are arranged. The positions of the virtual microphones 32-1 to 32-12 correspond to the control points. The sound pressure levels at the control points may be virtually measured by the virtual microphones 32-1 to 32-12 corresponding to respective control points.

In FIG. 6, the virtual microphones 32-1 to 32-12 are arranged at intervals of 30 degrees in a clockwise direction from a starting point located in the downward direction (in the front direction of the speaker 30). Although twelve virtual microphones 32-1 to 32-12 are provided, the number of virtual microphones is not limited thereto but may be more than, or less than, twelve. Also, an arrangement of the virtual microphones 32-1 to 32-12 is not limited to the example in FIG. 6 but the intervals therebetween may be smaller or larger, or irregular. That is, the number of control points is not limited to twelve but may be more than, or less than, twelve, and the control point does not need to be arranged at regular intervals.

In the following description of a typical calculation model of the directivity characteristics, at M-number of control points arranged on the circumference having the speaker 30 at the center thereof and the control distance serving as the radius, M-number of virtual microphones 32-1 to 32-M are virtually arranged (M: a natural number equal to or larger than 2). When it is not necessary to distinguish the M-number of virtual microphones 32-1 to 32-M from one another, the M-number of virtual microphones 32-1 to 32-M are collectively referred to as a virtual microphone 32.

<Signal Conversion by Filter>

In FIG. 2, the speakers 30-1 to 30-N are respectively connected to the output units 20-1 to 20-N having respective filters 22-1 to 22-N. The filters 22-1 to 22-N have respective filter transfer functions for converting the audio signal being input. Hereinafter, the filter transfer function corresponding to a filter 22-$i$ ($i$: a natural number equal to or smaller than N) is referred to as Hi.

Provided that $X(\omega)$ is the audio signal input to the filter 22, $Y(\omega)$ is the sound pressure level measured by the virtual microphone 32 (i.e., the sound pressure level at the control point), and $G(\omega)$ is a space transfer function from the speaker 30 to the virtual microphone 32, a relation between the $X(\omega)$ and the $Y(\omega)$ is expressed by Formula (1) set forth below. Here, since the X, the Y, the G, and the H have respective frequency spectra, the function includes an argument ($\omega$) ($\omega$: an angular frequency).

(Formula 1)

$$Y(\omega)=\{G(\omega)\cdot H(\omega)\}X(\omega)) \quad (1)$$

The $H(\omega)$ is an N-dimension column vector having the filter transfer functions (H1 to HN) of the filters 22-1 to 22-N as elements and expressed by the following Formula (2) (T represents transposition):

(Formula 2)

$$H(\omega)=[H_1(\omega)H_2(\omega)\ldots H_N(\omega)]^T \quad (2)$$

The $Y(\omega)$ is an M-dimension column vector having signals Y1($\omega$) to YM($\omega$) corresponding to the respective sound pressure levels measured by the virtual microphones 32-1 to 32-M as the elements and expressed by the following Formula (3) (T represents the transposition):

(Formula 3)

$$Y(\omega)=[Y_1(\omega)Y_2(\omega)\ldots Y_M(\omega)]^T \quad (3)$$

The $G(\omega)$ is an M×N matrix having Gjk($\omega$), which is the space transfer function from the speaker 30-$k$ at a k-th number (k: a natural number equal to or smaller than N) to the virtual microphone 32-$j$ at a j-th number (j: a natural number equal to or smaller than M) as the element and expressed by the following Formula (4):

(Formula 4)

$$G(\omega)=\begin{pmatrix} G_{11}(\omega) & G_{12}(\omega) & \ldots & G_{1N}(\omega) \\ G_{21}(\omega) & G_{22}(\omega) & \ldots & G_{2N}(\omega) \\ \vdots & \vdots & \ddots & \vdots \\ G_{M1}(\omega) & G_{M2}(\omega) & \ldots & G_{MN}(\omega) \end{pmatrix} \quad (4)$$

The Gjk($\omega$) is defined by a positional relationship between the speaker 30 and the virtual microphone 32 (the control point) and an existence of an object which absorbs or reflects the sound wave. The Gjk($\omega$) may be preliminarily calculated and stored in the storage unit 12 or recalculated on a real-time basis depending on a situation.

Here, when the $X(\omega)$, which is the audio signal input to the filter 22, takes an arbitrary value, the filter transfer function ($H(\omega)$) for imparting the predetermined directivity to the speaker 30 is expressed by the following Formula (5) and Formula (6).

(Formula 5)

$$H(\omega)=G^{-1}(\omega)\cdot D(\omega) \quad (5)$$

$$D(\omega)=[D_1(\omega)D_2(\omega)\ldots D_M(\omega)]^T \quad (6)$$

The $G^{-1}(\omega)$ is an inverse matrix of the $G(\omega)$. The $D(\omega)$ is the M-dimension column vector having, as the element, a value indicative of the sound pressure level at the control point corresponding to each of the virtual microphones 32, and serves as a control target of the directivity of the directivity characteristics of the speaker 30. A Dj($\omega$) serving as an element of the $D(\omega)$ is associated with the virtual microphone 32-$j$ (and the control point corresponding thereto) (j: a natural number equal to or smaller than the M).

In order to have the sound pressure level measured by the virtual microphone 32-$j$ at the first sound pressure level or higher, that is, in order to turn on the sound pressure level at the control point corresponding to the virtual microphone 32-$j$, Dj($\omega$)=1 is satisfied. Also, in order to have the sound pressure level measured by the virtual microphone 32-$j$ lower than the second sound pressure level, that is, in order to turn off the sound pressure level at the control point corresponding to the virtual microphone 32-$j$, Dj($\omega$)=0 is satisfied.

The sound pressure level at the control point is not limited to be turned on or off but may be weighted at each control point. That is, the value of the Dj($\omega$) is not limited to 0 or 1 but may be determined to be therebetween. Also, the value of the Dj(ω) should be relatively determined between the elements and may be a negative value or a value larger than 1.

For example, in the arrangement of the virtual microphones 32 (the control points) as illustrated in FIG. 6, the control target (D(ω)) of the directivity is set in the following manner. That is, in order to provide the directivity in directions of the virtual microphones 32-1, 32-2, and 32-12, i.e., in order to turn on the respective sound pressure levels at the respective control points corresponding to the virtual microphones 32-1, 32-2, and 32-12, the D1(ω), a D2(ω), and a D12(ω) are set to 1. On the other hand, in order to avoid the directivity in the directions of the virtual microphones 32-3 to 32-11, i.e., in order to turn off the respective sound pressure levels at the respective control points corresponding to the virtual microphones 32-3 to 32-11, D3(ω) to D11(ω) are set to 0. That is, the D(ω) is set as shown in the following Formula (7).

(Formula 6)

$$D(\omega)=[1\ 1\ 0\ 0\ 0\ 0\ 0\ 0\ 0\ 0\ 0\ 1]^T \quad (7)$$

As described above, by using the above formulas (5) and (6), the filter transfer function (H(ω)) may be calculated. The filter transfer function thus calculated is used for the conversion of the audio signal (X(ω)) input to the filter 22. The audio signal converted by the filter 22 is converted into the analogue signal by the D/A converter 24, amplified by the amplifier 26, and then output to the speaker 30. The control of the output of the speaker 30 in this manner allows the directivity of the speaker 30 to become approximate to the control target (D(ω)) being set.

In the control method of the directivity characteristics of the speaker 30 according to the present embodiment, a function of the speaker 30 is not limited to the main speaker 30a or the auxiliary speaker 30b. According to the present embodiment, the speaker 30 may function either as the main speaker 30a or as the auxiliary speaker 30b. That is, the speaker 30 of the present embodiment may be dynamically configured to have a function of the main speaker 30a or a function of the auxiliary speaker 30b.

<Flowchart of Control Method>

FIG. 7 is a flowchart illustrating a method of controlling the directivity of the speaker 30 (also referred to as a sound output control method). First, the controller 10 of the electronic apparatus 1 sets the control point (step S11). The setting of the control point may be performed by acquiring a value preliminarily stored in the storage unit 12, or performed in response to an input by the user.

Subsequently, the controller 10 sets the space transfer function (Gjk(ω)) (step S12). The setting of the space transfer function may be performed by acquiring a value preliminarily stored in the storage unit 12, or performed according to a result of a calculation based on information about the object located between the speaker 30 and the control point, and around the speaker 30. The step S12 may include a step in which the controller 10 causes the detection unit 40 to perform the detection around the electronic apparatus 1 and thereby acquires the information about the object located between the speaker 30 and the control point, or around the speaker 30.

Subsequently, the controller 10 sets the control target (D(ω)) of the directivity of the speaker 30 (step S13). The setting of the control target may be performed by acquiring a value preliminarily stored in the storage unit 12, or by appropriately calculating based on information about surrounding conditions including a position of the user and the like. The step S13 may include a step in which the controller 10 causes the detection unit 40 to perform the detection around the electronic apparatus 1 and thereby acquires the information about the surrounding conditions.

Subsequently, the controller 10 calculates the filter transfer function (H(ω)) (step S14). The filter transfer function is calculated by using the Formulas (5) and (6) set forth above.

Subsequently, the controller 10 converts the audio signal (X(ω)) input to the output unit 20 and outputs the audio signal thus converted to the speaker 30 (step S15). In the output unit 20, the filter 22 converts the audio signal by using the filter transfer function, and the D/A converter 24 converts the audio signal into the analogue signal, and then the amplifier 26 amplifies the analogue signal.

Figure 8A:
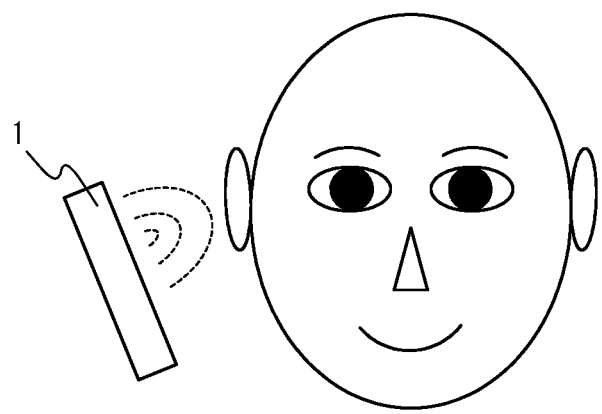
FIGS. 8A and 8B are examples of states of the electronic apparatus used by a user.

As described above, the controller 10 of the electronic apparatus 1 may control the directivity of the speaker 30. Therefore, as illustrated in FIG. 8A, for example, the user may hear the sound output from the speaker 30 even when the user has the electronic apparatus 1 spaced apart from the ear and, simultaneously, sound leakage to the surroundings may be reduced. On the other hand, in a situation where the directivity of the speaker 30 is not controlled by the control method of the present embodiment, the sound output from the speaker 30 leaks considerably when the electronic apparatus 1 is spaced apart from the ear, and therefore the electronic apparatus 1 needs to be in close contact with the ear as illustrated in FIG. 8B.

Figure 8B:
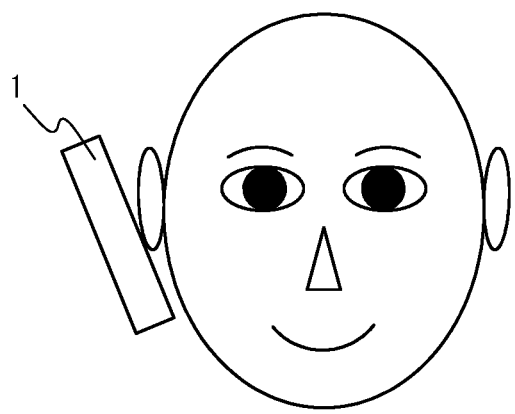

In comparison between a use mode illustrated in FIG. 8A and a use mode illustrated in FIG. 8B, the user feels more comfortable with the use mode in which the electronic apparatus 1 is spaced apart from the ear as illustrated in FIG. 8A. That is, the use mode as illustrated in FIG. 8A may suppress human sweat and dirt from attaching to the electronic apparatus 1 and reduce uncomfortable feeling the user may have when the electronic apparatus 1 is in tight contact to the user.

[Setting Space Transfer Function Based on Surrounding Conditions]

As described above, in order to output the audio signal by controlling the directivity, the space transfer function from the speaker 30 to the control point needs to be set. The space transfer function is set based on a position of the object located between the speaker 30 and the control point, or around the speaker 30, i.e., based on the surrounding conditions. According to the present embodiment, the controller 10 of the electronic apparatus 1 may cause the detection unit 40 to detect the surrounding conditions and set the space transfer function based on the surrounding conditions acquired from the result of the detection. The following is a description of an operation performed by the controller 10 to set the space transfer function based on the surrounding conditions. This operation is included in the operation (the setting of the space transfer function) at step S12 in the flowchart illustrated in FIG. 7.

<Detection by Ultrasonic Sensor>

Figure 9A:
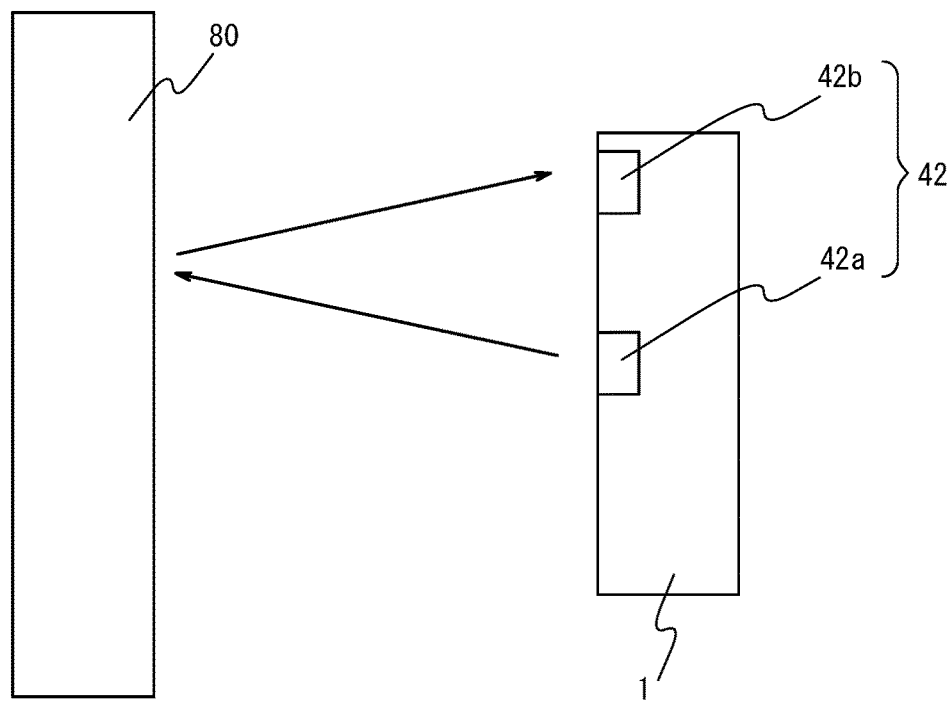
FIGS. 9A and 9B are examples of a configuration of the electronic apparatus to detect an object by using an ultrasonic sensor.
Figure 9B:
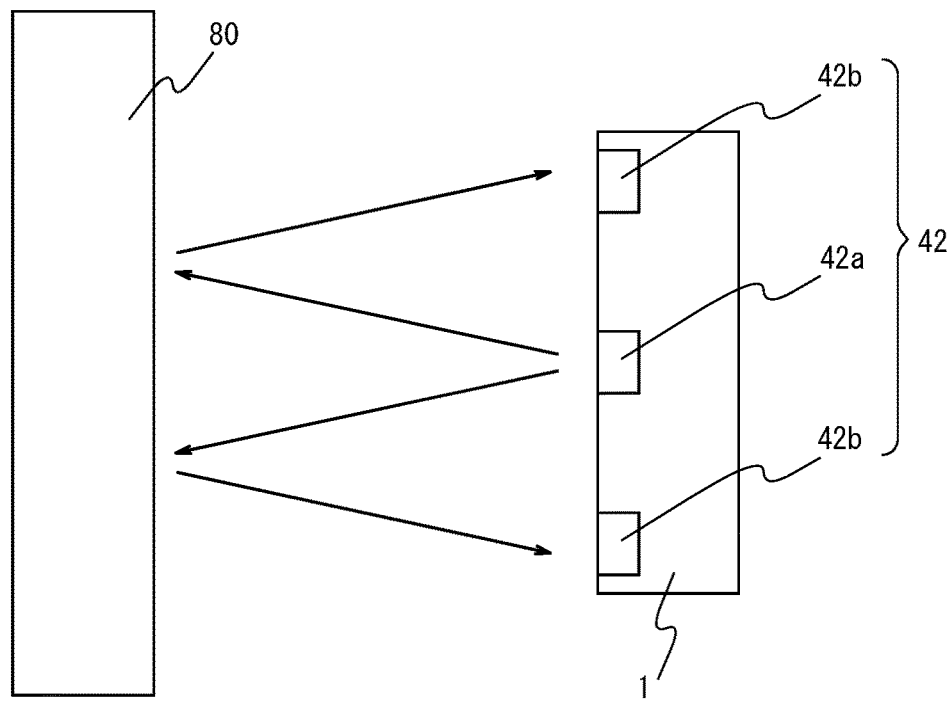

Referring to FIGS. 9A and 9B, the electronic apparatus 1 having the ultrasonic sensor 42 serving as the detection unit 40 will be described. FIGS. 9A and 9B are diagrams illustrating configurations in which the electronic apparatus 1 detects the object by using the ultrasonic sensor 42. The ultrasonic sensor 42 illustrated in FIG. 9A includes a transmission unit 42a for transmitting an ultrasonic signal and a photodetector unit 42b for receiving the ultrasonic signal. Also, the ultrasonic sensor 42 illustrated in FIG. 9B includes one transmission unit 42b for transmitting the ultrasonic signal and two photodetector units 42b for receiving the ultrasonic signal.

The transmission unit 42b of the ultrasonic sensor 42 transmits the ultrasonic signal to the object. The ultrasonic signal thus transmitted reflects on the object. In examples illustrated in FIGS. 9A and 9B, the object is a wall 80. The photodetector unit 42b receives the ultrasonic signal having reflected on the wall 80 and thus detects the existence of the wall 80. Here, the wall 80 is a wall installed in a typical house, office, or the like and includes, for example, wallpaper, thermal insulation material, and the like.

In FIG. 9B, the two photodetector units 42b are provided. Therefore, the ultrasonic signals having reflected on two positions on the object may be separately received. Accordingly, a plane of the object as well as a point of the object may be detected and, in comparison to FIG. 9A, the object may be detected with higher sensitivity. Further, a size of the object may also be measured (detected). Note that the number of photodetector units 42b is not limited to 1 or 2 but may be 3 or more. In this case, since the ultrasonic signals having reflected on more positions may be received, the object may be detected with even higher sensitivity.

Although in the example illustrated in FIGS. 9A and 9B the wall 80 is detected as the object, the object is not limited to the wall 80 but may be clothing, metal, and the like. Also, another object which reflects the ultrasonic signal may also be detected. Further, the ultrasonic sensor 42, by calculating a gain of the ultrasonic signal received, may measure (detect) a reflection coefficient of an ultrasonic wave (or an absorption coefficient of the ultrasonic wave) with respect to the object. Here, the reflection coefficient of the ultrasonic wave refers to a ratio of amplitude of a returning wave having reflected to amplitude of a travelling wave.

Figure 10:
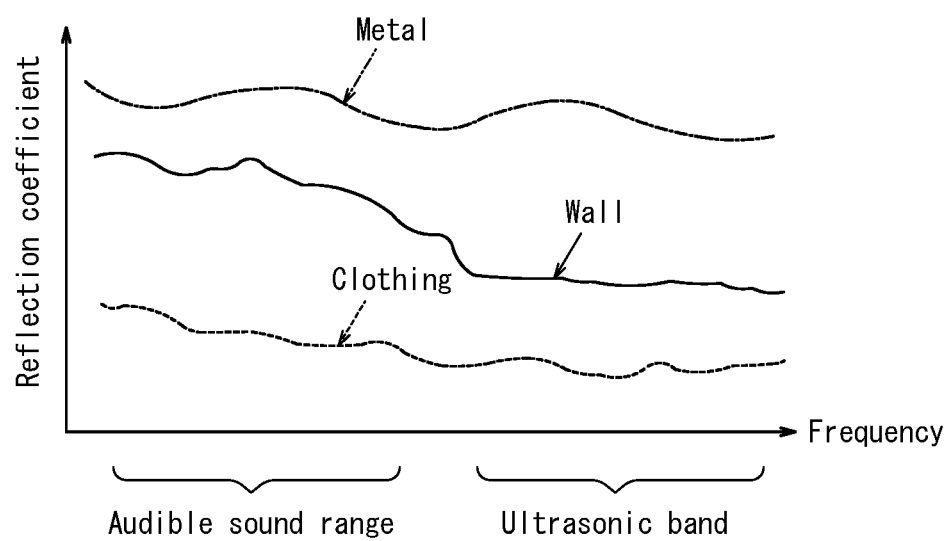
FIG. 10 is a graph illustrating an example of frequency characteristics of a reflection coefficient of a sound wave with respect to each material.

FIG. 10 is a graph illustrating an example of frequency characteristics of the reflection coefficient of the sound wave with respect to each material. In FIG. 10, a horizontal axis represents a frequency, and a vertical axis represents the reflection coefficient. In FIG. 10, a solid line represents the reflection coefficient with respect to the wall 80, a broken line represents the reflection coefficient with respect to clothing, and a dashed line represents the reflection coefficient with respect to metal.

In FIG. 10, an approximate left half of a frequency band represented by the horizontal axis is an audible range, and an approximate right half is an ultrasonic band. For example, the reflection coefficient with respect to the wall 80 differs between the audible range and the ultrasonic band. However, a size relation of the wall 80 with other materials stays the same. That is, the reflection coefficient with respect to the wall 80 is larger than the reflection coefficient with respect to clothing and smaller than the reflection coefficient with respect to metal. Therefore, it can be said that the reflection coefficient of the ultrasonic wave measured (detected) by the ultrasonic sensor 42 is somehow correlated to the reflection coefficient of an audible sound used for the calculation of the space transfer function. Note that, generally, the reflection coefficient is higher with respect to a hard material and lower with respect to a soft material.

The controller 10 may identify a material of the object based on the frequency characteristics of the reflection coefficient of the sound wave with respect to each material illustrated in FIG. 10 and the frequency characteristics of the reflection coefficient acquired in measurement using the ultrasonic wave at different frequencies output from the ultrasonic sensor 42.

Also, the controller 10, while the ultrasonic sensor 42 is outputting the ultrasonic wave, may detect a change in an output angle of the ultrasonic sensor 42 by, for example, detecting a change in an angle of the ultrasonic sensor 42 changed by an actuator or the like, or detecting, by using an acceleration sensor or the like, a change in a position of the electronic apparatus 1 itself by the user, and thus may detect the size of the object based on the output angle and received ultrasonic wave having been output at each angle.

Also, the controller 10, when using the ultrasonic sensor 42 having a plurality of transmission units and a plurality of photodetector units arranged in an array, may detect the size of the object based on a result of measurement of the ultrasonic wave detected by the photodetector units arranged in an array.

Also, the reflection coefficient illustrated in FIG. 10 is generally correlated to the size of the object and increases in proportion thereto. Therefore, from the frequency characteristics of the reflection coefficient of the sound wave and the reflection coefficient with respect to each material illustrated in FIG. 10, the controller 10 may identify the size of the object.

Also, the controller 10, by using the graph of FIG. 10 illustrating an example of the frequency characteristics of the reflection coefficient of the sound wave with respect to each material, may calculate the reflection coefficient of the audible sound from the reflection coefficient of the signal at each frequency such as the ultrasonic wave.

Also, the ultrasonic sensor 42 may measure (detect) a distance to the object by calculating delay time from transmission of the ultrasonic signal to reception thereof.

The controller 10 of the electronic apparatus 1, from the ultrasonic sensor 42, acquires a result of the detection (a result of the measurement) about presence/absence of the object, the distance to the object, or the reflection coefficient of the ultrasonic wave with respect to the object. Then, the controller 10, based on the result of the detection (the result of the measurement), may set the space transfer function.

The controller 10 may calculate the space transfer function in consideration of information included in the result of the detection (the result of the measurement) acquired from the ultrasonic sensor 42. For example, when there is the object around the speaker 30, a component of the reflected sound wave from the object affects the space transfer function. Therefore, the calculation of the space transfer function in consideration of the information included in the result of the detection (the result of the measurement) of the ultrasonic sensor 42 may enhance accuracy of the space transfer function.

Figure 11:
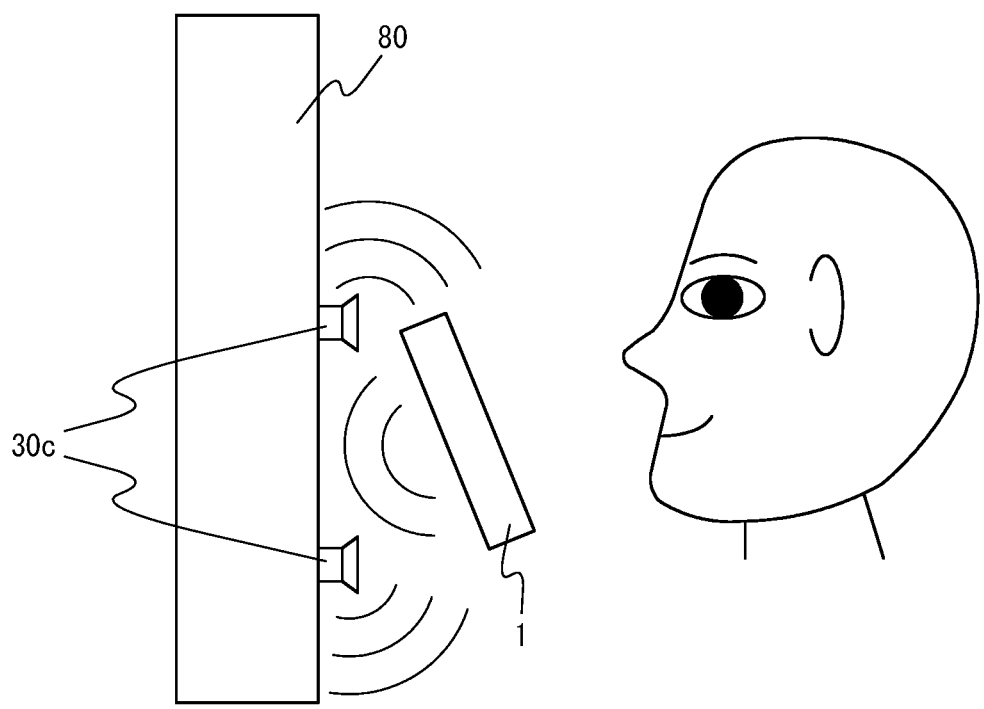
FIG. 11 is an example in which the electronic apparatus is used near a wall.

FIG. 11 is a diagram illustrating a state in which the electronic apparatus 1 is used near the wall 80. The sound wave output from the speaker 30 of the electronic apparatus 1 reflects on the wall 80. In this case, the wall 80 is considered to have a virtual speaker 30c arranged thereon. An output from the virtual speaker 30c is calculated from a distance from the speaker 30 to the wall 80, a size of the wall 80, and the reflection coefficient of the audible sound with respect to the wall 80. The controller 10 may enhance the accuracy of the space transfer function by calculating the space transfer function in consideration of the output from the virtual speaker 30c.

Also, the controller 10 may compare the information about the object acquired from the result of the detection (the result of the measurement) by the ultrasonic sensor 42 to preliminarily prepared models and set the space transfer function corresponding to a model closest thereto. Here, the model preliminarily assumes an existence pattern of the object located around the speaker 30 and between the speaker 30 and the control point. For example, when the wall 80 locates behind the electronic apparatus 1, a pattern corresponding to a condition in which there is the third party nearby other than the user may be prepared. In this case, the preliminarily prepared models and the space transfer functions corresponding thereto may be stored in the storage unit 12.

The condition in which the ultrasonic sensor 42 is used as the detection unit 40 has been described above. This configuration allows the setting of the space transfer function based on the surrounding conditions and may enhance the accuracy in the control of the directivity of the speaker 30.

Note that the present embodiment may use, as the detection unit 40 described above, a combination of the speaker 30 and a microphone for detecting the audible sound. In a description and a figure of an embodiment using the speaker 30 and the microphone as the detection unit 40, the ultrasonic sensor 42 is replaced by the speaker 30 and the microphone in the description and the figures in which the ultrasonic sensor 42 is used as the detection unit 40. Also, in the description using the ultrasonic sensor 42 as the detection unit 40 as described above, the ultrasonic signal is replaced by the audible sound. Although the audible sound normally has a frequency of approximately 20 to 20000 Hz, but the audible sound preferably has a frequency of 7000 Hz or more in consideration of the directivity of the audible sound. Also, the transmission unit 42a and the photodetector unit 42b of the ultrasonic sensor 42 for transmitting and receiving the ultrasonic signal are replaced by the speaker and the microphone, respectively. Also, the microphone and the speaker functioning as the detection unit 40 are preferably arranged on the same plane of the housing. In the embodiment using, as the detection unit 40, the combination of the speaker 30 and the microphone for detecting the audible sound, similarly to the embodiment using the detection unit 40 as the ultrasonic sensor 42, the controller 10 of the electronic apparatus 1 acquires, from the detection unit 40 constituted by using the combination of the speaker 30 and the microphone for detecting the audible sound, the result of the detection (the result of the measurement) including the presence/absence of the object, the distance to the object, the size of the object, the reflection coefficient of the ultrasonic wave with respect to the object, and the like. When the combination of the speaker 30 and the microphone for detecting the audible sound is used as the detection unit 40 as described above, similarly to the embodiment using the ultrasonic sensor 42, the controller 10 may set the space transfer function based on the result of the detection (the result of the measurement).

<Detection by Infrared Sensor>

Figure 12:
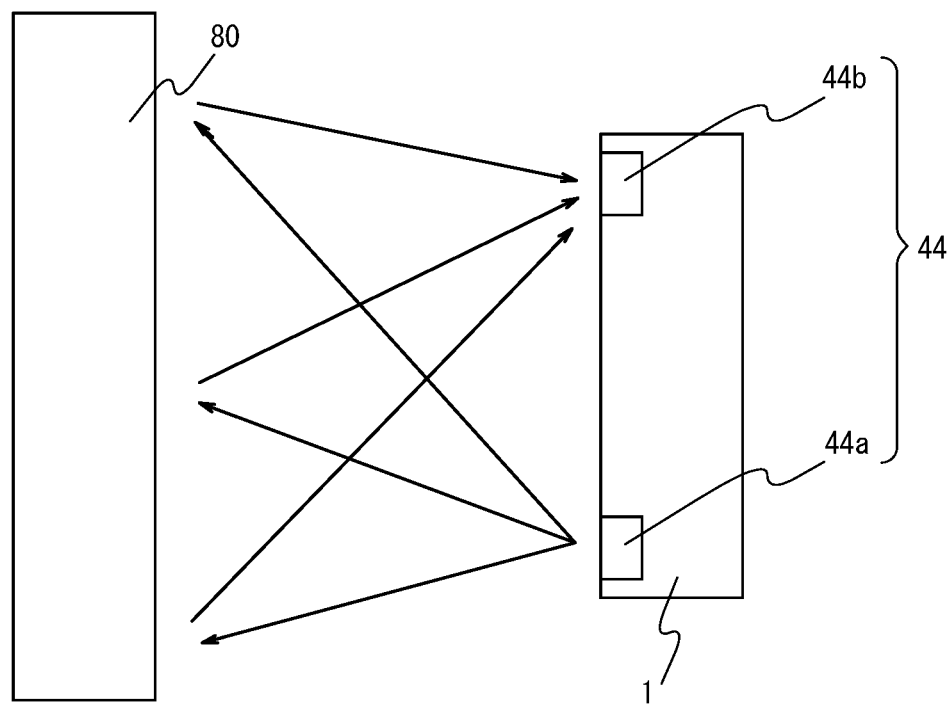
FIG. 12 is an example of a configuration of the electronic apparatus to detect the object by using an infrared sensor.

Referring to FIG. 12, the electronic apparatus 1 having the infrared sensor 44 serving as the detection unit 40 will be described. FIG. 12 is a diagram illustrating a configuration in which the electronic apparatus 1 detects the object by using the infrared sensor 44. The infrared sensor 44 includes a projection unit 44a for projecting an infrared beam and a photodetector unit 44b for receiving the infrared beam.

The projection unit 44a of the infrared sensor 44 projects the infrared beam to the object. The infrared beam projected reflects on the object. In an example illustrated in FIG. 12, the object is the wall 80. The photodetector unit 44b receives the infrared beam having reflected on the wall 80 and thereby detects the existence of the wall 80.

Although in FIG. 12 the infrared beam projected from the projection unit 44a expands, the projection unit 44a may project a spotlight of the infrared beam to the object. In this case, for example, PSD (Position Sensitive Detector) is used as the photodetector unit 44b, whereby a deviation of a receiving position of the infrared beam having reflected on the subject may be measured (detected). Then, based on a result of measurement (a result of detection) of the deviation of the receiving position, the distance to the object may be measured (detected).

Although in an example illustrated in FIG. 12 the wall 80 is detected as the object, the object to be detected is not limited thereto but may be a human or another object which reflects or scatters the infrared beam. Also, when the photodetector unit 44b is an infrared camera having a plurality of pixels, the photodetector unit 44b may detect a shape of the object. Or, when the projection unit 44a is omitted, the photodetector unit 44b may receive the infrared beam radiated from the object and thereby detect the existence of the object.

The controller 10 of the electronic apparatus 1, similarly to that using the ultrasonic sensor 42, acquires, from the infrared sensor 44, the result of the detection (the result of the measurement) about the presence/absence of the object, the distance to the object, the size of the object, and the like. Then, the controller 10 may set the space transfer function based on the result of the detection (the result of the measurement).

The controller 10, similarly to that using the ultrasonic sensor 42, may calculate the space transfer function in consideration of the information included in the result of the detection (the result of the measurement) acquired from the infrared sensor 44. Or, the controller 10 may compare the information about the object acquired from the result of the detection (the result of the measurement) of the infrared sensor 44 to the preliminarily prepared models and set the space transfer function corresponding to a model closest thereto. In this case, the preliminarily prepared models and the space transfer functions corresponding thereto may be stored in the storage unit 12. The models are the same as those in the description of the ultrasonic sensor 42, and thus a description thereof will be omitted.

The condition using the infrared sensor 44 as the detection unit 40 has been described above. This configuration allows the setting of the space transfer function corresponding to the surrounding conditions and may enhance the accuracy in the control of the directivity of the speaker 30.

<Detection by Camera>

Figure 13:
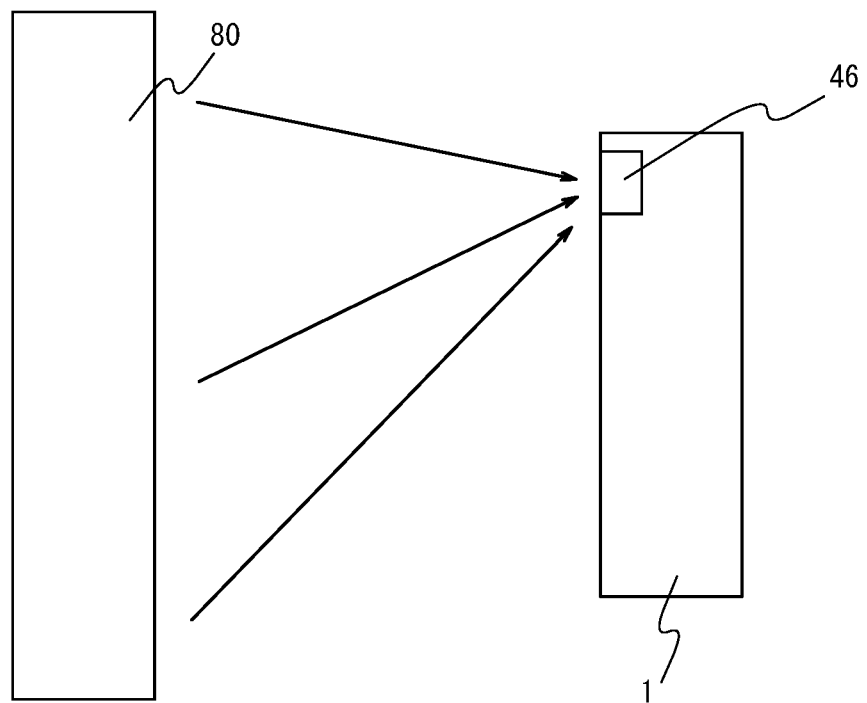
FIG. 13 is an example of a configuration of the electronic apparatus to detect the object by using a camera.

Referring to FIG. 13, the electronic apparatus 1 including the camera 46 serving as the detection unit 40 will be described. FIG. 13 is a diagram illustrating a configuration in which the electronic apparatus 1 detects the object by using the camera 46.

The camera 46 captures an image around the electronic apparatus 1 and detects the existence of the wall 80 by performing image processing.

Although in an example illustrated in FIG. 3 the wall 80 is detected as the object, the object to be detected is not limited thereto but may be the human or another object which may be identified by the image processing. When an object which includes a portion in a known size (referred to as a known object) is detected, the image processing may enable the measurement (detection) of the distance to the object. Also, when a plurality of cameras 46 are provided, the distance to the object may be measured (detected). The camera 46 may include a separate projection unit for assisting the imaging That is, the controller 10 recognizes the object and the known object in the captured image by performing image recognition. Then, the controller 10, from the size of the known object and the like in the captured image, calculates a distance from the camera 46 to the known object and an actual size. Then, the controller 10 calculates the distance to the object and the actual size from the distance to the known object, the actual size, and contrast information at the time of focusing the object and the know object on each other.

The controller 10 acquires the result of the detection (the result of the measurement) about the presence/absence of the object, the distance to the object, or the shape of the object, and the like from the camera 46. Then, the controller 10 may set the space transfer function based on the result of the detection (the result of the measurement).

The controller 10, similarly to that using the ultrasonic sensor 42, may calculate the space transfer function in consideration of the information included in the result of the detection (the result of the measurement) acquired from the camera 46. Or, the controller 10 may compare the information about the object acquired from the result of the detection (the result of the measurement) of the camera 46 to the preliminarily prepared models and set the space transfer function corresponding to a model closest thereto. In this case, the preliminarily prepared models and the space transfer functions corresponding thereto may be stored in the storage unit 12. The models are similar to those in the description of the ultrasonic sensor 42, and thus a description thereof will be omitted.

The condition using the camera 46 as the detection unit 40 has been described above. This configuration allows the setting of the space transfer function based on the surrounding conditions and may enhance the accuracy in the control of the directivity of the speaker 30.

The method of setting the space transfer function based on the surrounding conditions by detecting the surrounding conditions using the detection unit 40 has been described above. This configuration allows the controller 10 to control the signal to be output to the speaker 30 based on the result of the detection by the detection unit 40 and to control the directivity more accurately.

[Setting Directivity Based on Surrounding Conditions]

As described above, the controller 10 of the electronic apparatus 1 sets the control target (D(ω)) of the directivity of the speaker 30 and calculates the filter transfer function (H(ω)) based on the control target. Then, the controller 10 outputs the audio signal converted by using the filter transfer function calculated to the speaker 30 and thus may make the directivity of the speaker 30 approximate to the control target.

The value set to the D(ω) may be a predetermined value. In this case, for example, the D(ω) may be set in such a manner that the directivity of the speaker 30 suitable for the use of the electronic apparatus 1 held in front of the face by the user may be acquired. Or, D(ω) is not limited to the value of this example, but a value of the D(ω) for making the directivity of the speaker 30 suitable to each possible use mode may be preliminarily prepared. Also, the value of the D(ω) preliminarily prepared may be stored in the storage unit 12.

Or, the value of the D(ω) may be automatically set based on the surrounding conditions. The following is a description of an operation performed by the controller 10 to control the directivity by setting the value of the D(ω) based on the surrounding conditions. This operation is included in the operation (the setting of the control target of the directivity) at step S13 of the flowchart illustrated in FIG. 7.

According to the present embodiment, the directivity of the speaker 30 is controlled such that the sound is sufficiently audible to the user while not leaking to the third party other than the user. To that end, the controller 10 acquires, as information about the surrounding conditions, for example, the information about a user's position by using the detection unit 40. Then, the controller 10 automatically sets the control target (D(ω)) of the directivity based on the user's position.

<Detection by Camera>

Figure 14:
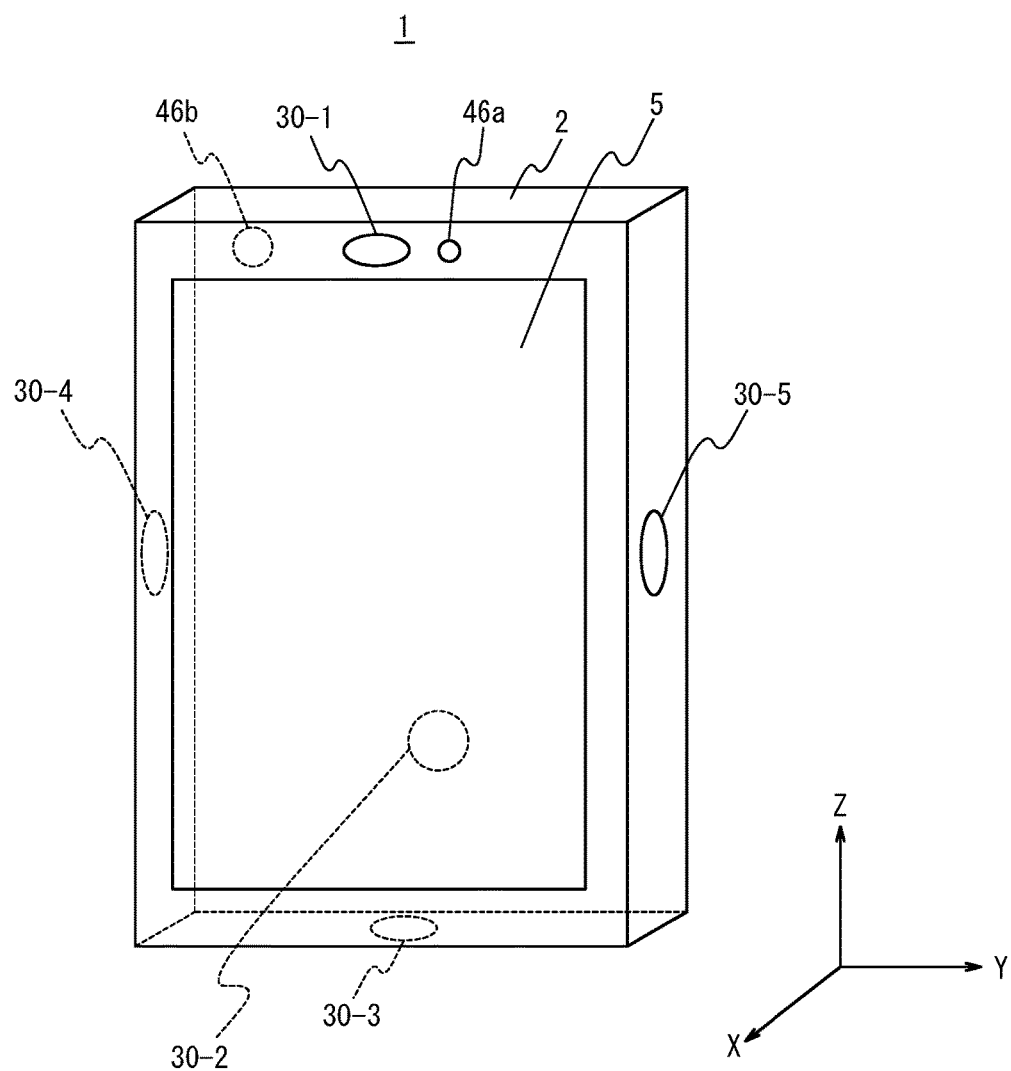
FIG. 14 is a configuration of the electronic apparatus illustrated in FIG. 3 further including a camera 46.

The following is a description of a condition in which the controller 10, in order to acquire the information about the user's position, uses the camera 46 serving as the detection unit 40. FIG. 14 illustrates an embodiment in which the electronic apparatus 1 illustrated in FIG. 3 further includes the camera 46. In FIG. 14, a front camera 46a is arranged in an upper portion of the front surface of the housing 2 of the electronic apparatus 1, and a rear camera 46b is arranged in an upper portion of the rear surface of the housing 2. Hereinafter, the front camera 46a and the rear camera 46b may be collectively referred to as the camera 46.

The controller 10 causes the camera 46 to capture the image around the electronic apparatus 1 in conjunction with the output of the audio signal to the speaker 30. At this time, the front camera 46a alone, or the rear camera 46b alone, or both of them may capture the image.

Figure 15A:
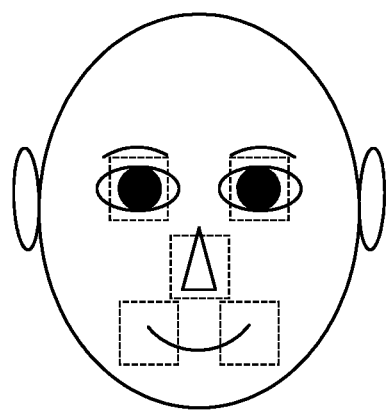
FIGS. 15A and 15B are examples of an extraction operation of features of the human face.
Figure 15B:
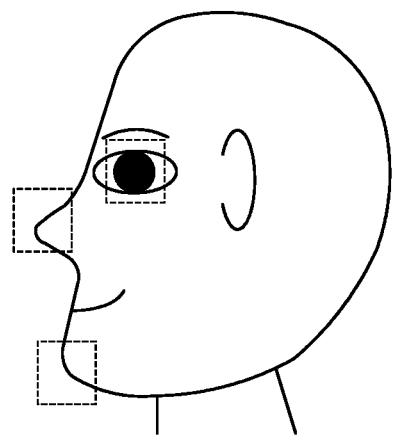

The controller 10 acquires the captured image from the camera 46 and determines whether the captured image contains the user. This determination is performed by employing a typical face recognition technology. For example, the controller 10 performs an operation to extract features of a human face from the captured image. FIGS. 15A and 15B are diagrams illustrating an example of the operation to extract the features of the human face. For example, FIG. 15A is an image of the human face captured from a front side thereof, in which the eyes, the nose, and corners of the mouth are extracted as features and surrounded by broken lines. Also, for example, FIG. 15B is an image of a profile of the human, in which the eye, the nose, and the chin are extracted as features and surrounded by broken lines.

When the controller 10 determines that the captured image of the camera 46 contains a person, determines whether the person is the user of the electronic apparatus 1. This determination is performed by comparing with registry data of the user which is preliminarily stored in the storage unit 12 or acquired from another device by the acquisition unit 14. The controller 10, for example, by comparing the features of the face as illustrated in FIGS. 15A and 15B, determines whether the person in the captured image corresponds to the user included in the registry data.

Also, the controller 10 may calculate a positional relationship between the speaker 30 and the user from the captured image of the camera 46. The controller 10 controls the directivity of the speaker 30 based on the position of the user calculated. That is, the controller 10 sets an element of the D(ω) corresponding to the direction of the user to 1, and other elements to 0. Thereby, the user may easily hear the sound output from the speaker 30 and, simultaneously, the sound leakage in directions other than the direction of the user may be suppressed.

Further, the controller 10 may calculate a position of the user's ear from the captured image. The position of the ear may be directly extracted from the captured image, or calculated based on positions of the features other than the ear (e.g., the eye, the nose, the corner of the mouth, and the like) extracted from the captured image. Then, the controller 10 controls the directivity of the speaker 30 based on the position of the user's ear thus calculated. That is, the controller 10 sets an element of the D(ω) corresponding to a direction of the user's ear to 1, and other elements to 0.

Figure 16C:
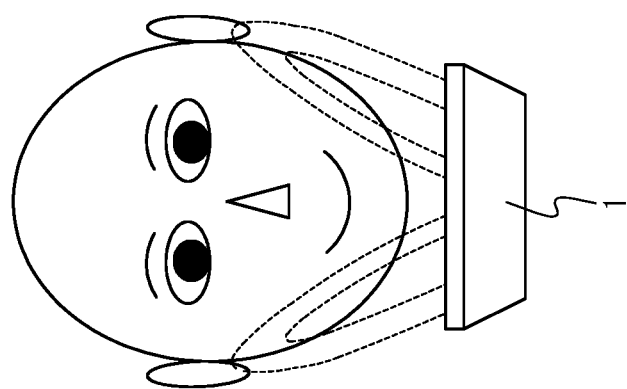
FIGS. 16A, 16B and 16C are examples of modes of the speaker having the directivity toward the user's ear.
Figure 16B:
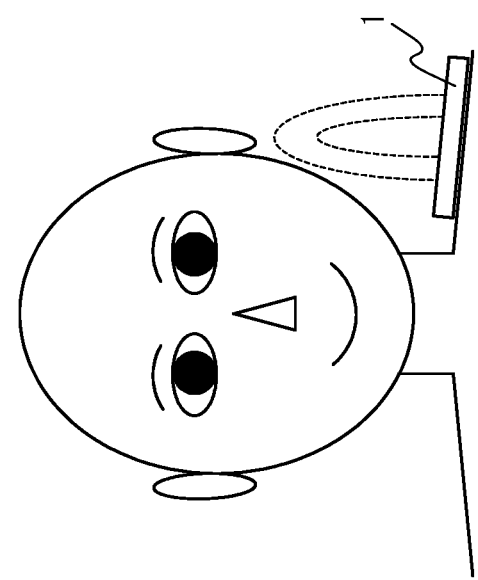
Figure 16A:
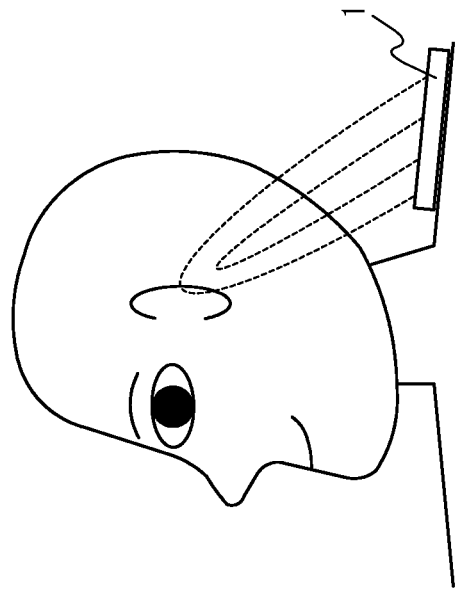

FIGS. 16A, 16B and 16C are diagrams illustrating examples of modes of the speaker 30 having the directivity in the direction of the user's ear. FIG. 16A illustrates a state in which the user is using the electronic apparatus 1 holding the electronic apparatus 1 in front of the user. The controller 10 calculates positions of the user's both ears and causes the speaker 30 to have the directivity in two directions corresponding to the positions of the both ears, instead of the directivity in all directions in front of the speaker 30. That is, the controller 10 sets elements of the D($\omega$) corresponding to the directions of the right ear and the left ear to 1, and other elements to 0. Thereby, the user may easily hear the sound output from the speaker 30.

FIG. 16B illustrates a state in which the user is using the electronic apparatus 1 on the shoulder. The controller 10 calculates the position of the ear closer to the electronic apparatus 1 and causes the speaker 30 to have the directivity in the direction of this ear. Also, FIG. 16C illustrates a state in which the user is facing sideways in the state of FIG. 16B. In this case, the controller 10 detects a movement of the position of the user's ear, recalculates the position of the ear, and then causes the speaker 30 to have the directivity in the direction of the ear after the movement. Thereby, the user may further easily hear the sound output from the speaker 30.

As described above, the camera 46 recognizes the user, and the directivity is automatically controlled based on a result of recognition. Thereby, when the positional relationship between the user and the electronic apparatus 1 changes, the output of the speaker 30 is automatically adjusted, whereby the user may easily hear the sound output from the speaker 30 and, simultaneously, the sound leakage in the directions other than the direction of the user is suppressed.

Note that, in order for the camera 46 to recognize the user, the user needs to be positioned within a capturing range of the camera 46. Therefore, the camera 46 is provided with a wide-angle lens. When the position of the ear is no longer detected in the capturing range of the camera 46 because of a movement of the position of the ear or a movement of the electronic apparatus 1, the controller 10 may stop either the control of the directivity of the speaker 30 or the output of the sound itself from the speaker 30.

<Detection by Ultrasonic Sensor>

The controller 10 uses, in order to acquire the information about the position of the user, for example, the ultrasonic sensor 42 (see FIGS. 9A and 9B) serving as the detection unit 40. The ultrasonic sensor 42 may detect, as described above, the distance to the object located around the speaker 30, the size of the object, the reflection coefficient of the ultrasonic wave with respect to the object, and the like. The controller 10 may determine whether the object is a human body from the reflection coefficient of the ultrasonic wave with respect to the object acquired from the ultrasonic sensor 42.

When an existence of the human body around the speaker 30 is recognized from the result of the detection by the ultrasonic sensor 42, the controller 10 may set the control target of the directivity of the speaker 30 to a direction of the human body recognized.

<Detection by Infrared Sensor>

The controller 10 uses, in order to acquire the information about the position of the user, for example, the infrared sensor 44 (see FIG. 12) serving as the detection unit 40. The infrared sensor 44 may detect, as described above, the distance to the object located around the speaker 30, the size of the object, the shape of the object, and the like. The controller 10 may determine whether the object is the human body from the information about the object acquired from the infrared sensor 44. When the existence of the human body around the speaker 30 is recognized from the result of the detection by the infrared sensor 44, the controller 10 may set the control target of the directivity of the speaker 30 to the direction of the human body recognized.

As set forth above, the method of automatically setting the control target of the directivity based on the surrounding conditions by detecting the surrounding conditions using the detection unit 40 has been described. Thereby, when the positional relationship between the user and the electronic apparatus 1 changes, the controller 10 may automatically adjust the output of the speaker 30. Accordingly, the user may further easily hear the sound output from the speaker 30 and, simultaneously, the sound leakage in the directions other than the direction of the user may be suppressed.

[Volume Control Based on Distance to the Ear]

The above description also includes that the detection unit 40 may measure the distance to the object at the time of the detection of the surrounding conditions. The following is a description about the detection unit 40 which also measures the distance to the ear and volume control of the sound output from the speaker 30 based on the distance to the ear.

When the sound pressure level output from the speaker 30 is constant regardless of a distance between the speaker 30 and the ear, the sound becomes more difficult to hear when the distance is longer, and the sound becomes louder when the distance is shorter. According to the present embodiment, the controller 10 measures the distance between the speaker 30 and the ear and, based on the distance to the ear, adjusts the sound pressure level output from the speaker 30.

Figure 17:
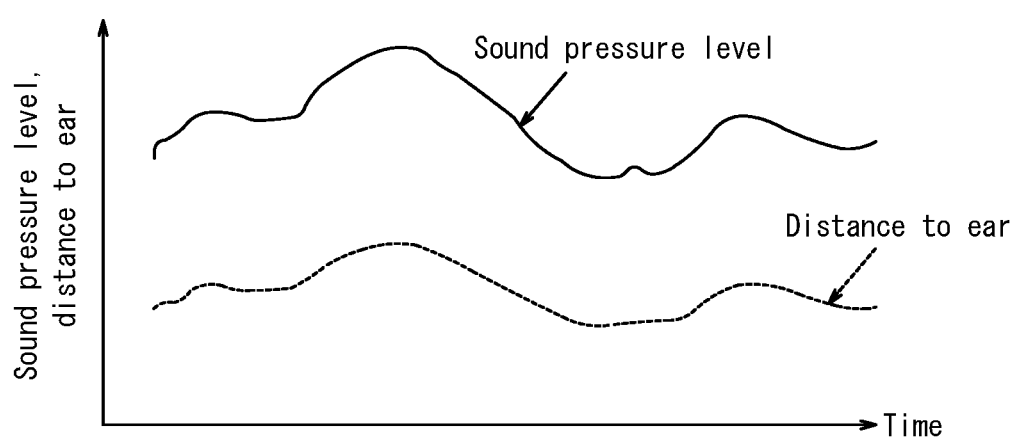
FIG. 17 is a graph illustrating an example of temporal variations of a distance between the speaker and the ear and a sound pressure level output from the speaker.

FIG. 17 is a graph illustrating an example of temporal changes in the distance between the speaker 30 and the ear and in the sound pressure level output from the speaker 30. The distance between the speaker 30 and the ear is represented by a broken line, and the sound pressure level output from the speaker 30 is represented by a solid line. The distance between the speaker 30 and the ear is measured (detected) by the detection unit 40. The controller 10, based on the change in the distance between the speaker 30 and the ear, changes the sound pressure level output from the speaker 30. Thereby, the volume of the sound entering the user's ear is appropriately maintained, and the user may easily hear the sound.

As set forth above, the method of setting the control target of the directivity of the speaker 30 based on the surrounding conditions by detecting the surrounding conditions using the detection unit 40 has been described. Thereby, based on the result of the detection by the detection unit 40, the controller 10 may control the signal to be output to the speaker 30 and thus control the directivity more accurately.

According to the electronic apparatus 1 of the present embodiment as described above, the directivity of the speaker 30 may be appropriately controlled. Also, based on the result of the detection of the surrounding conditions by the detection unit 40, the signal to be output to the speaker 30 may be controlled, and the directivity of the speaker 30 may be automatically controlled. As a result, the user of the electronic apparatus 1 may easily hear the sound output from the speaker 30 and, simultaneously, the sound is less likely to leak to the third party other than the user.

(Variation 1)

In the present embodiment, an example to recognize the user and control the directivity of the speaker 30 so as to direct the output of the speaker 30 to the user has been described. Variation 1 describes an example to simultaneously recognize two users and control the directivity to direct the output of the speaker 30 to each of the users.

Figure 18:
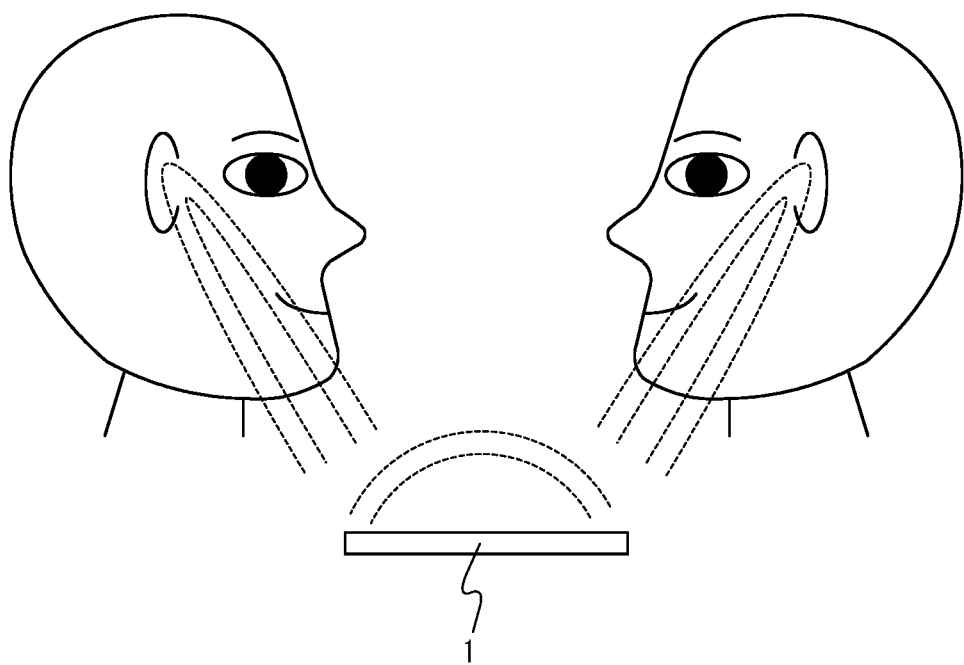
FIG. 18 is an example of the directivity of the speaker when two users are recognized at the same time.

FIG. 18 is a diagram illustrating an example of the control of the directivity when two users are simultaneously recognized. The electronic apparatus 1 is located between the two users and, for example, the camera 46 is used as the detection unit 40. The controller 10 of the electronic apparatus 1 recognizes each of the two users from the captured image of the camera 46. Then, the controller 10 sets the control target D(ω) of the directivity in such a manner that the speaker 30 has the directivity to each of the users, and controls the output to the speaker 30. Thereby, each of the users may easily hear the sound, and the sound leakage in directions other than directions of the users is suppressed.

Although in the present variation two users are simultaneously recognized, more users may be simultaneously recognized and the directivity of the speaker 30 may be controlled such that the output from the speaker 30 is directed to each of the users.

(Variation 2)

In the present embodiment, the speaker 30 of the electronic apparatus 1 is arranged as illustrated in FIG. 3. Variation 2 describes an example of the arrangement of the speaker 30.

Figure 20A:
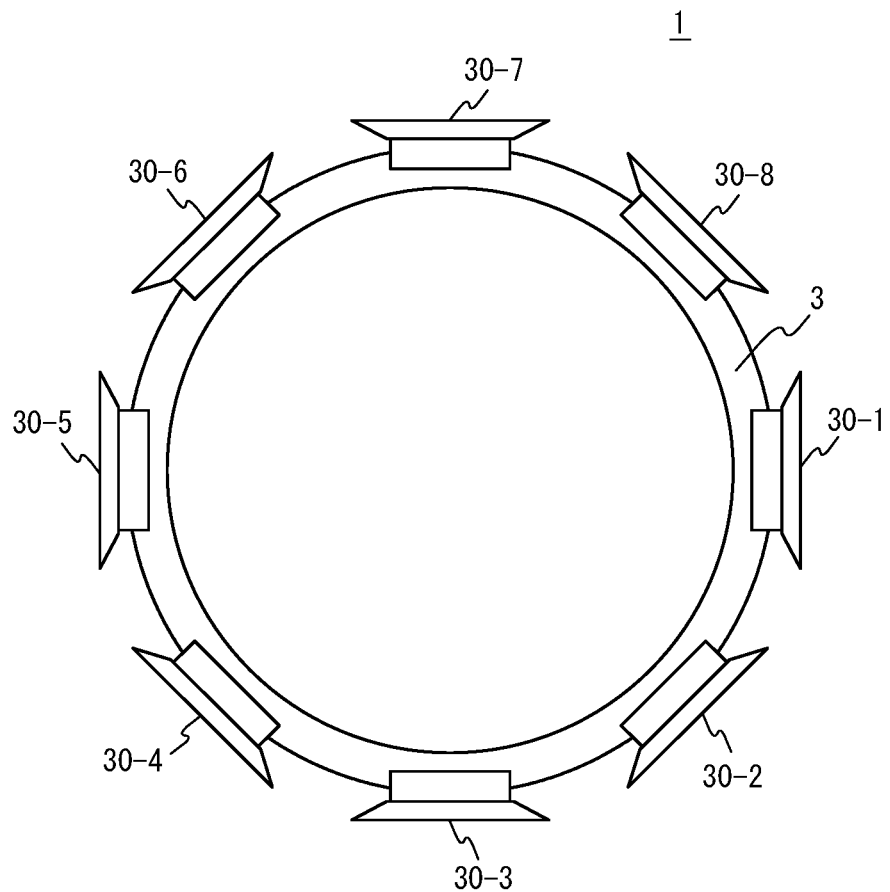
FIGS. 20A and 20B illustrate an example of the electronic apparatus in the shape of a ring having the speakers radially arranged.
Figure 20B:
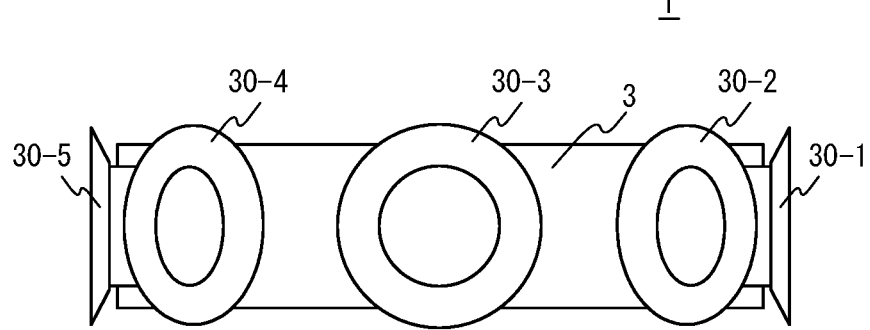
Figure 21A:
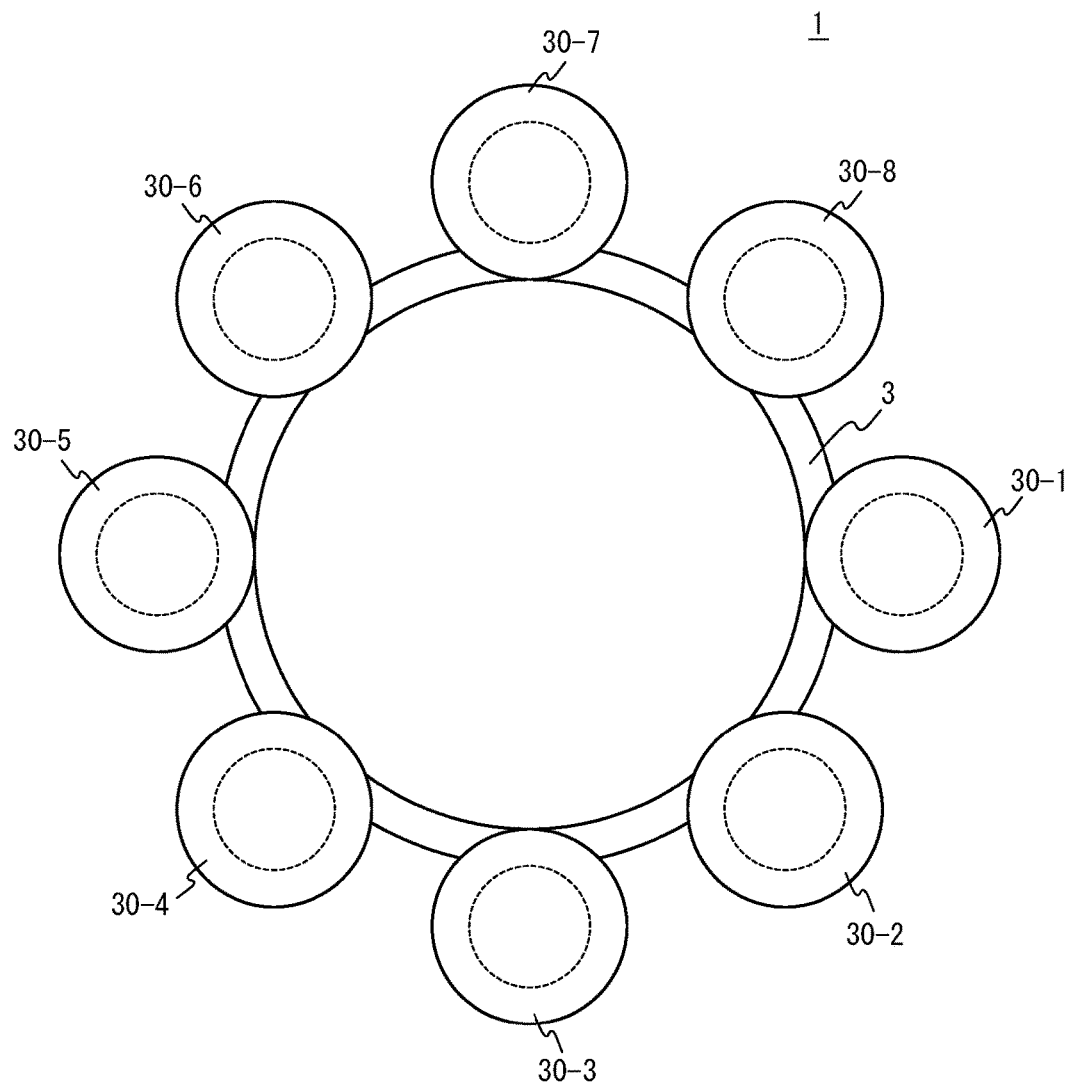
FIGS. 21A and 21B illustrate an example of the electronic apparatus in the shape of the ring having the speakers arranged on a circumference.
Figure 21B:
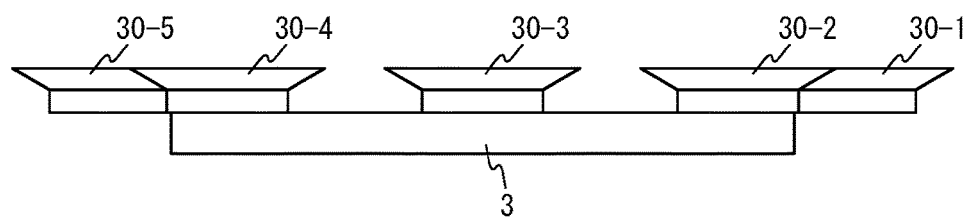

FIGS. 19A and 19B, FIGS. 20A and 20B, and FIGS. 21A and 21B are diagrams illustrating examples of the electronic apparatus 1 having different arrangements of the speaker 30. FIG. 19A, FIG. 20A, and FIG. 21A illustrate plan views, and FIG. 19B, FIG. 20B, and FIG. 21B illustrate elevation views. Although eight speakers 30 are arranged in these figures, the number of speakers 30 is not limited to eight.

FIGS. 19A and 19B illustrate an example of the electronic apparatus 1 having the speakers 30-1 to 30-8 arranged on a support 3 in the shape of a belt (in the shape of a string, or in the shape of a line). This electronic apparatus 1 has a controllable range of the directivity of the speaker 30 mainly in an extending direction of the belt. Thereby, the use mode of the electronic apparatus 1 has more variations, improving convenience.

FIGS. 20A and 20B illustrate an example of the electronic apparatus 1 having the speakers 30-1 to 30-8 radially arranged on a support 3 in the shape of a ring. This electronic apparatus 1 has the controllable range of the directivity of the speaker 30 mainly in a circumferential direction of the ring. Thereby, the use mode of the electronic apparatus 1 has more variations, improving convenience.

FIGS. 21A and 21B illustrate an example of the electronic apparatus 1 having the speakers 30-1 to 30-8 arranged on a circumference of the support 3 in the shape of the ring. This electronic apparatus 1 has the controllable range of the directivity of the speaker 30 mainly in an arbitrary upward direction in FIG. 21B. Thereby, the use mode of the electronic apparatus 1 has more variations, improving convenience.

As set forth above, the variations have been described. Controlling the directivity of the speaker 30 in these manners may allow the user to easily hear the sound and, simultaneously, suppress the sound leakage in directions other than the direction of the user.

The electronic apparatus 1 according to one embodiment, or the electronic apparatus 1 according to the variations, may be various apparatuses including a wearable apparatus, a portable apparatus, a desktop apparatus, and the like. Also, these apparatuses may be used for various purposes including listening to music, viewing a video, making a telephone call, conducting an audio conference, and the like.

According to the disclosure herein, an electronic apparatus capable of appropriately controlling a directivity of a speaker and a sound output control method may be provided.

Although the disclosure herein has been described based on the figures and the embodiment, it is to be understood that various modifications and changes may be implemented based on the disclosure herein by those who are ordinarily skilled in the art and thus are included in the scope of the disclosure herein. For example, a function and the like included in each constituent, step and the like may be rearranged without logical inconsistency, so as to combine a plurality of constituents or steps together or to separate them. It should be also understood that, although the apparatus has been mainly described in the disclosure herein, a method including the step executed by each constituent of the apparatus may also implement the disclosure herein. Further, although the apparatus has been mainly described in the disclosure herein, a method or a program executed by a processor of the apparatus, a program, and a storage medium storing the program may also implement the disclosure herein and thus are included in the scope of the disclosure herein.

The invention claimed is:

1. An apparatus comprising:
   a plurality of sound output units;
   a detection unit for detecting an object around the apparatus; and
   a controller for controlling a directivity characteristic of the plurality of sound output units by setting at least one control point including an area of interest at the object and setting a space transfer function from the plurality of sound output units to the at least one control point on the basis of a characteristic of the object detected by the detection unit, to direct sound output by the sound output units toward an area of interest at the object,
   wherein the space transfer function is based on surrounding conditions acquired from a result of the detection.

2. The apparatus according to claim 1, wherein the detection unit detects at least one of a distance to the object and a size of the object.

3. The apparatus according to claim 1, wherein the detection unit is provided with an ultrasonic wave sensor and detects a reflection coefficient of an ultrasonic wave with respect to the object.

4. The apparatus according to claim 2, wherein the detection unit is provided with an ultrasonic wave sensor and detects a reflection coefficient of an ultrasonic wave with respect to the object.

5. The apparatus according to claim 1, further comprising a housing, wherein
   the plurality of sound output units are arranged on different surfaces of the housing.

6. The apparatus according to claim 2, further comprising a housing, wherein
   the plurality of sound output units are arranged on different surfaces of the housing.

7. The apparatus according to claim 3, further comprising a housing, wherein
   the plurality of sound output units are arranged on different surfaces of the housing.

8. The apparatus according to claim 4, further comprising a housing, wherein
   the plurality of sound output units are arranged on different surfaces of the housing.

9. The apparatus according to claim 1, comprising an imaging unit for capturing an image, wherein
   the controller detects a position of a predetermined user based on the image captured by the imaging unit and, based on the position detected, controls the signal to be output to the sound output unit.

10. The apparatus according to claim 2, comprising an imaging unit for capturing an image, wherein
the controller detects a position of a predetermined user based on the image captured by the imaging unit and, based on the position detected, controls the signal to be output to the sound output unit.

11. The apparatus according to claim 3, comprising an imaging unit for capturing an image, wherein
the controller detects a position of a predetermined user based on the image captured by the imaging unit and, based on the position detected, controls the signal to be output to the sound output unit.

12. The apparatus according to claim 4, comprising an imaging unit for capturing an image, wherein
the controller detects a position of a predetermined user based on the image captured by the imaging unit and, based on the position detected, controls the signal to be output to the sound output unit.

13. The apparatus according to claim 5, comprising an imaging unit for capturing an image, wherein
the controller detects a position of a predetermined user based on the image captured by the imaging unit and, based on the position detected, controls the signal to be output to the sound output unit.

14. The apparatus according to claim 6, comprising an imaging unit for capturing an image, wherein
the controller detects a position of a predetermined user based on the image captured by the imaging unit and, based on the position detected, controls the signal to be output to the sound output unit.

15. The apparatus according to claim 9, wherein the controller detects a position of a predetermined user's ear based on the image captured by the imaging unit and, based on the position of the ear detected, controls the signal to be output to the sound output unit.

16. The apparatus according to claim 10, wherein the controller detects a position of a predetermined user's ear based on the image captured by the imaging unit and, based on the position of the ear detected, controls the signal to be output to the sound output unit.

17. The apparatus according to claim 11, wherein the controller detects a position of a predetermined user's ear based on the image captured by the imaging unit and, based on the position of the ear detected, controls the signal to be output to the sound output unit.

18. A sound output control method comprising:
detecting an object around an apparatus having a plurality of sound output units; and
controlling, by setting at least one control point including an area of interest at the object and setting a space transfer function from the plurality of sound output units to the at least one control point based on a characteristic of the object detected by the detection, a directivity characteristic of the plurality of sound output units, to direct sound output by the sound output units toward an area of interest at the object,
wherein the space transfer function is based on surrounding conditions acquired from a result of the detection.

19. The apparatus according to claim 1, wherein
the controller controls the directivity characteristic by setting a plurality of control points arranged on a circumference having the sound output units located at a center of the circumference, and
the object is located between the sound output units and the control points.

20. The sound output method according to claim 18, wherein
the controlling controls the directivity characteristic by setting a plurality of control points arranged on a circumference having the sound output units located at a center of the circumference, and
the object is located between the sound output units and the control points.

* * * * *